United States Patent
Ikematsu et al.

(10) Patent No.: US 6,933,343 B2
(45) Date of Patent: Aug. 23, 2005

(54) STYRENE POLYMER RESIN AND COMPOSITION THEREOF

(75) Inventors: Takeshi Ikematsu, Musashino (JP); Toshiharu Kawasaki, Yokohama (JP); Ikuji Ohtani, Yokohama (JP); Mitsutoshi Toyama, Yokohama (JP)

(73) Assignee: PS Japan Corporation, Tokyo (JP)

( * ) Notice: Subject to any disclaimer, the term of this patent is extended or adjusted under 35 U.S.C. 154(b) by 0 days.

(21) Appl. No.: 10/482,801

(22) PCT Filed: May 7, 2003

(86) PCT No.: PCT/JP03/05690

§ 371 (c)(1),
(2), (4) Date: Jan. 5, 2004

(87) PCT Pub. No.: WO03/095499

PCT Pub. Date: Nov. 20, 2003

(65) Prior Publication Data

US 2004/0192844 A1 Sep. 30, 2004

(30) Foreign Application Priority Data

May 10, 2002 (JP) .................. 2002-135734

(51) Int. Cl.$^7$ .............. C08L 25/14; C08F 2/04; C08F 218/02
(52) U.S. Cl. .............. 525/98; 525/227; 526/65; 526/392.2; 526/347
(58) Field of Search .............. 526/65, 329.2, 526/347; 525/98, 227

(56) References Cited

U.S. PATENT DOCUMENTS 3,252,950 A * 5/1966 Schmitt et al. .............. 526/65
3,513,145 A * 5/1970 Crawford .............. 526/65
6,759,498 B2 * 7/2004 Ikematsu et al. .............. 526/346

FOREIGN PATENT DOCUMENTS

| JP | 57-135814 A | 8/1982 |
| JP | 59-221348 A | 12/1984 |
| JP | 61-25819 A | 2/1986 |
| JP | 63-286406 A | 11/1988 |
| JP | 4-239511 A | 8/1992 |
| JP | 9-111070 A | 4/1997 |
| JP | 9-111073 A | 4/1997 |
| JP | 2000-159920 A | 6/2000 |
| JP | 2001-2870 A | 1/2001 |
| JP | 2001-26619 A | 1/2001 |

OTHER PUBLICATIONS

English language translation of JP 63–286406, published Nov. 1988.*

* cited by examiner

Primary Examiner—Fred Teskin
(74) Attorney, Agent, or Firm—Birch, Stewart, Kolasch & Birch, LLP

(57) ABSTRACT

The present invention provides a method for manufacturing a styrene-based polymer having the steps of continuously feeding raw materials into one end of two or more polymerization vessels connected in series; polymerizing a styrenic monomer in the coexistence of a (meth)acrylate ester monomer by using an organic radical generating agent as an initiator by a mass or solution polymerization method of continuous process; and continuously taking out a product from another end of the polymerization vessels, wherein polymerization conditions are controlled in ranges specified by the following items (a) and (b): (a) a composition of monomers to be fed is 60 to 97% by weight of a styrenic monomer(s) and 3 to 40% by weight of a (meth)acrylate ester monomer(s); and (b) a concentration of the (meth) acrylate ester monomer(s) at any part of the polymerization vessels exceeds 1% by weight based on total monomers at any time during the polymerization.

21 Claims, 1 Drawing Sheet

STYRENE POLYMER RESIN AND COMPOSITION THEREOF

TECHNICAL FIELD

The present invention relates to a method for manufacturing a styrene-based polymer containing a trimer in a range of specified amount. The trimer has a cyclic structure containing at least one unit each of styrenic monomer unit and (meth)acrylate ester monomer unit in the molecule. The present invention also relates to a styrene-based polymer resin mainly composed of the styrene-based polymer obtainable by said method. The present invention further relates to a styrene-based polymer resin composition comprising said resin.

Said styrene-based polymer resin and said styrene-based polymer resin composition are superior in heat and processing stabilities and also remarkably superior in durability during rework (reprocessing). They can be suitably used for packaging films, heat shrink films, packaging containers and further various molding applications by utilizing their excellent rework durability, transparency that is an essential feature of a styrene-based resin, as well as other physical properties.

BACKGROUND ART

Styrene-based polymer resins have been conventionally used for various industrial materials such as electric appliances, sundries, cushioning materials, heat insulating materials, food containers and the like, because of their superior moldability, processability and well-balanced resin performances. Recently, they have been used as labels for food packaging and food containers by molding to a sheet or a film or by subjecting them to a further secondary processing.

In these fields of applications, a sheet or a film is generally required to have a smooth surface, transparency, less unevenness in thickness and superior strength characteristics. In general, styrene-based polymer resins are not practical in strength as a non-stretched sheet or film. However, it can be converted, by stretching, to a tough and stiff sheet or film with superior transparency, surface gloss and toughness. For this purpose, there are employed measures such as sheeting or stretching at a low temperature, and if necessary, further secondary processing at a low temperature.

However, a polystyrene resin as a typical styrene-based polymer resin is inferior in moldability to sheet or film, because of its relatively high softening point as well as its rigid and brittle properties. More specifically, in a sheeting or stretching process and also in a secondary processing at a low temperature, a polystyrene resin is inferior in processability and has problems such that uneven thickness is caused by poor fluidity and the resulting sheet is likely to be broken. Therefore, it is very difficult to obtain a sheet or a film having superior strength characteristics with a high stretching ratio.

For these fields of applications, a copolymer resin consisting of styrenic monomer and acrylate ester monomer or methacrylate ester monomer (hereinafter abbreviated as (meth)acrylate ester monomer) has been already known as a resin improved in the weak points of the polystyrene resin.

By copolymerizing styrene with a (meth)acrylate ester, the softening point can be adjusted, and the weak points of the polystyrene resin, i.e. rigidity and brittleness, can be also improved. Furthermore, a sheet or a film obtained by forming and processing the styrene-(meth)acrylate ester copolymer resin is superior also in strength characteristics.

More specifically, Reference 1 mentioned below discloses that a resin composition comprising a copolymer composed of a vinyl aromatic hydrocarbon and an aliphatic unsaturated carboxylic acid derivative and the like (including (meth) acrylate ester monomer); and a block copolymer of styrene-conjugated diene (hereinafter abbreviated as a styrene-based block copolymer), is superior in processability of cold draw, stretching characteristics and crack resistance of film.

In addition, Reference 2 mentioned below discloses that a low temperature shrinkable film, obtained by uniaxially stretching a resin composition comprising a copolymer composed of a vinyl aromatic hydrocarbon and an aliphatic unsaturated carboxylic acid derivative and the like and a styrene-based block copolymer, is superior in low temperature shrink performance, low temperature shrink stress, stiffness, transparency, crack resistance characteristics, dimensional stability and the like.

Further, Reference 3 mentioned below discloses that a sheet and a film of a resin composition comprising a copolymer of styrene and n-butyl acrylate and a styrene-based block copolymer with specified structure or characteristics has well-balanced physical properties.

However, the styrene-based polymer resin used for these polymer compositions was a composition that had problems in thermal and processing stabilities depending on conditions used, although it was superior in a balance of physical properties of a sheet or a film. A specific problem relating to thermal and processing stabilities includes a problem of resin rework.

With increasing consciousness of cost reduction and environmental problems in recent years, the reduction of industrial waste has been strongly required. Consequently, the rework of molding chip and the like generated in molding and processing processes has become inevitable. Therefore, a resin with processing stability durable to the rework is strongly desired. Here, "rework" means recycling of poorly molded articles as well as trimmed edges, broken resin chips and the like in the sheet molding. In view of this point, the processing stability of a conventional styrene-based polymer resin was not necessarily sufficient. In particular, in an application to transparent sheets and films that is a target of the present invention, coloring occurred by resin deterioration, foreign matters and uneven flow are very conspicuous, and can be fatal drawback of the rework of resin. Therefore, a technique such as blending a small amount of selected rework resin into a virgin resin is currently employed as a measure.

It has been heretofore conceived that the problems of thermal and processing stabilities of a styrene-based polymer resin is mainly caused by cyclic styrene oligomers present in the resin. More specifically, cyclic oligomers present in a styrene-based polymer resin thermally decompose during processing to generate a radical (see, for example, Reference 4 mentioned below). Deterioration is mainly caused by scission or crosslinking of polymer chains induced by the radical generated.

As a measure to solve this problem, the use of a polystyrene resin obtained by anion polymerization has been proposed. It is said that a polystyrene resin obtained by anion polymerization does not contain the cyclic styrene oligomers and thus has remarkably superior stability (also see Reference 4 mentioned below). However, it has not yet been industrially realized probably because of cost problem.

In view of less oligomers content, a styrene-based polymer resin obtained by suspension polymerization method is also known.

For example, a styrene-based polymer resin, which has a total weight of a monomer, a dimer, a trimer and a solvent being not higher than 0.8% by weight, a unit composition being 80 to 99.5% by mole of styrenic monomer and 0.5 to 20% by mole of (meth)acrylate ester monomer and a limited solution viscosity, has a wide range of molding conditions and well-balanced moldability and strength. As a method for manufacturing said styrene-based polymer resin, it is known that any of mass polymerization method, solution polymerization method, suspension polymerization method and emulsion polymerization method can be used (see Reference 5 mentioned below). However, the above prior art references do not disclose any effect achieved by specifying the structure of a styrene-based trimer or any method therefor.

Reference 6 mentioned below discloses that a styrene-based resin obtained by a suspension polymerization at a low temperature contains not higher than 400 ppm of a styrene dimer and a styrene trimer. Reference 6 also discloses the copolymerization of a (meth)acrylate ester in an amount of less than 50% by weight and teaches the use of the obtained styrene-based polymer resin for a food packaging application by utilizing low elution of oligomer from the copolymer.

Furthermore, Reference 7 mentioned below discloses that a styrene-based copolymer composed of 50 to 80% by weight of styrenic monomer and 20 to 50% by weight of (meth)acrylate ester monomer, with unreacted monomer being not higher than 1000 ppm and the total weight of a styrene dimer and a styrene trimer being not higher than 1000 ppm, is superior in productivity in processing and appearance of molded article, has less odor and thus is suitable in an application such as food packaging containers. A manufacturing method disclosed in the Example of Reference 7 is limited to a suspension radical polymerization method.

However, the suspension polymerization method is usually limited to a batch process and the use of a dispersing agent is not avoidable in the polymerization step. Probably because of this reason, the styrene-based polymer resin obtained by a suspension polymerization method had problems such as coloring of resins due to processing history such as rework, easy whitening due to water absorption, or a disadvantage in cost.

Reference 1: JP-A-59-221348
Reference 2: JP-A-61-025819
Reference 3: JP-A-2001-002870
Reference 4: JP-A-09-111073
Reference 5: JP-A-04-239511
Reference 6: JP-A-2000-159920
Reference 7: JP-A-2001-026619

DISCLOSURE OF THE INVENTION

An object of the present invention is to provide a styrene-based polymer resin having a superior rework performance attained by improving thermal and processing stabilities, and also maintaining superior transparency and other properties intrinsic to the styrene-based polymer resin. Another object of the present invention is to provide an efficient method for manufacturing the same resin.

The present inventors extensively studied to solve the above-described problems and, as a result, have found that the problems of the conventional technology can be improved by using a styrene-based polymer having particular structure and characteristics obtained by polymerizing under specific conditions. The present inventions thus completed the present invention.

The present invention relates mainly to the following items 1) to 3):

1) A method for manufacturing a styrene-based polymer comprising the steps of continuously feeding raw materials into one end of two or more polymerization vessels connected in series; polymerizing a styrenic monomer in the coexistence of a (meth)acrylate ester monomer by using an organic radical generating agent as an initiator by a mass or solution polymerization method of continuous process; and continuously taking out a product from another end of said polymerization vessels, wherein polymerization conditions are controlled in ranges specified by the following items (a) and (b):

(a) a composition of monomers to be fed is 60 to 97% by weight of a styrenic monomer(s) and 3 to 40% by weight of a (meth)acrylate ester monomer(s); and (b) a concentration of the (meth)acrylate ester monomer(s) at any part of said polymerization vessels exceeds 1% by weight based on total monomers at any time during the polymerization.

2) A styrene-based polymer resin containing, as a main component, a styrene-based polymer obtained by the steps of continuously feeding raw materials into one end of two or more polymerization vessels connected in series; polymerizing a styrenic monomer in the coexistence of a (meth)acrylate ester monomer by using an organic radical generating agent as an initiator by a mass or solution polymerization method of continuous process; and continuously taking out a product from another end of said polymerization vessels, wherein said styrene-based polymer has features shown by the following items (a') to (d'):

(a') monomer units composing said styrene-based polymer are in ranges of 60 to 97% by weight of a styrenic monomer unit(s) and 3 to 40% by weight of a (meth)acrylate ester monomer unit(s);

(b') weight average molecular weight of said styrene-based polymer is 150,000 to 550,000;

(c') said styrene-based polymer contains, in a range of 1,000 to 10,000 ppm, a cyclic structured trimer containing at least one unit each of styrenic monomer unit and (meth)acrylate ester monomer unit in the molecule; and (d') Vicat softening point of said styrene-based polymer is in a range of 50 to 99° C.

3) A styrene-based polymer resin composition comprising:

(A) 5 to 95% by weight of styrene-(meth)acrylate ester copolymer resin;

(B) 95 to 5% by weight of styrene-conjugated diene block copolymer; and (C) 0 to 30% by weight of a polymer compatible to said styrene-based polymer or said styrene-based polymer resin of the above (A) or (B); wherein, said styrene-(meth)acrylate ester copolymer resin of said component (A) is the styrene-based polymer resin according to the above (2); said styrene-conjugated diene block copolymer of said component (B) has characteristics of the following items (e') to (g'); and further said styrene-based polymer resin composition has characteristics of the following items (h') and (i'):

(e') said styrene-conjugated diene block copolymer is composed of at least two styrene-based polymer blocks and at least one conjugated diene polymer block;

(f') a content of styrenic monomer unit composing said styrene-conjugated diene block copolymer is 40 to 95% by weight;

(g') a content of conjugated diene monomer unit composing said styrene-conjugated diene block copolymer is 60 to 5% by weight;

(h') vicat softening point of said styrene-based polymer resin composition is in a range of 50 to 99° C.; and (i') total transmittance of a 1 mm-thick plate of said styrene-based polymer resin composition is not less than 75%.

BEST MODE FOR CARRYING OUT THE INVENTION

Figure 1:
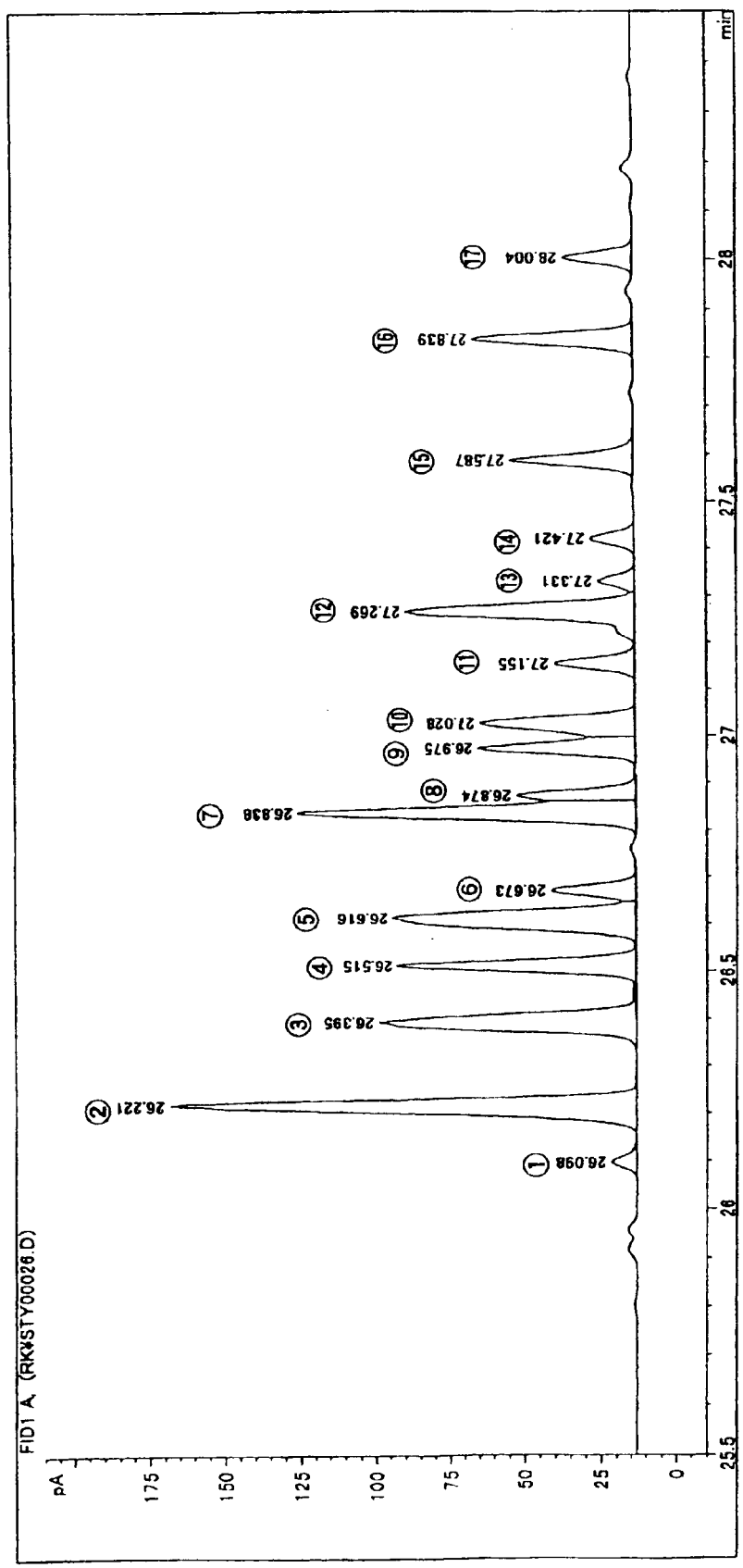
FIG. 1 is a chart showing the peaks of oligomers in the polymer obtained in Example 1 detected by a gas chromatography.

The first object of the present invention is to provide a method for manufacturing a novel styrene-based polymer.

As a polymerization method for a styrene-based polymer, a radical polymerization method, an anionic polymerization method, a coordinated anionic polymerization method and a cationic polymerization method are known in the art. Among them, a method for manufacturing a styrene-based polymer of the present invention is performed by a radical polymerization method.

Radical polymerization method for styrene-based polymer is classified, in view of polymerization process, into a mass polymerization method, a solution polymerization method, a suspension polymerization method and an emulsion polymerization method, each of which is known and has been employed industrially owing to its features. A thermal radical polymerization method and an initiator radical polymerization method are known, when they are classified in view of the initiator used. Among them, the method for manufacturing a styrene-based polymer of the present invention is limited to an initiator radical polymerization method by mass or solution method.

Suspension polymerization is a method of dispersing monomers in water and using an initiator for polymerization. The suspension polymerization method is superior in mixing property and heat removal during the polymerization, but requires the addition of a dispersing agent, thus resulting in mixing of the dispersing agent in the product. Further, the suspension polymerization method is usually performed in a batch process, which limits its use because of a disadvantage in cost. Contrary to this, the mass polymerization method and the solution polymerization method for a styrene-based polymer are widely used depending on purposes.

Thermal radical polymerization is a method of generating thermal radicals by heating a styrenic monomer liquid and initiating polymerization. It has the features of low cost and little contamination with impurities. On the other hand, the initiator radical polymerization method uses a radical initiator. The radical initiator usually used is a compound to generate a radical by thermal decomposition. Organic peroxides and azo compounds are known as the radical initiator. This method has such a feature that the decomposition temperature of a radical initiator and accordingly the polymerization temperature can be relatively freely selected. However, this method is a little disadvantageous in view of the cost of the initiator. Thus, currently, the mass thermal polymerization method is widely used industrially, because of less contamination of impurity and an advantage in cost.

Specified disclosures in JP-A-2000-159920 and JP-A-2001-026619 as described above are limited to a suspension polymerization technique. Specified disclosures of a polymerization method for a styrene-based polymer in JP-A-59-221348 and JP-A-61-025819 are limited to a thermal radical polymerization method. Further, JP-A-2001-002870 specifically discloses an initiator radical polymerization method but it relates to a batch process.

According to the description in JP-A-04-239511, polymerization using an initiator in a complete mixing type of reactor is preferable in order to obtain a styrene-based polymer with superior transparency. The description in the Example thereof is limited to a polymerization using one unit of complete mixing type of polymerization vessel. A complete mixing type of polymerization vessel enables sufficient mixing of raw materials in a vessel, and thus the styrene-based polymer resin obtained has an uniform composition due to a homogeneous composition of raw materials. The uniform composition of resin results in superior transparency because of less light scattering coming from less deviation in refractive index.

Polymerization by a complete mixing type of polymerization vessel has a feature to provide a styrene-based polymer with no deviation in composition distribution, but has problems in industrial use. One is that a sufficient level of conversion is hardly achieved relative to a residence time, because of short pass of raw materials fed occurring at any time. This is apparent from the Examples of the above patent reference, which shows a polymer concentration of only 51 to 52% by weight (equivalent to a conversion of 52.6 to 55.9% by weight) under a residence time of 6 to 7 hours. Another problem is that an increase in an initiator concentration to accelerate the polymerization rate is not only disadvantageous in cost but also lowers the molecular weight of a polymer obtained. It can also cause a problem that short passed initiator, when it reaches a devolatilization process, thermally decomposes and causes crosslinking, scission or decomposition of the polymer chain.

Contrary to these conventional technologies, a method for manufacturing the styrene-based polymer of the present invention has the following features. Namely, the present invention provides a method for manufacturing a styrene-based polymer comprising the steps of continuously feeding raw materials into one end of two or more polymerization vessels connected in series; polymerizing a styrenic monomer in the coexistence of a (meth)acrylate ester monomer by using an organic radical generating agent as an initiator by a mass or a solution polymerization method of continuous process; and continuously taking out a product from another end of said polymerization vessels, wherein polymerization conditions are controlled in the ranges specified by the following items (a) and (b):

(a) a composition of monomers to be fed is 60 to 97% by weight of a styrenic monomer(s) and 3 to 40% by weight of a (meth)acrylate ester monomer(s); and (b) a concentration of (meth)acrylate ester monomer(s) at any part of said polymerization vessel exceeds 1% by weight based on total monomers at any time during the polymerization.

One effect attained by the method for manufacturing a styrene-based polymer of the present invention is enabling to suppress the generation of a cyclic styrene trimer composed only of styrene monomer units (hereinafter abbreviated simply as "cyclic styrene trimer") that is contained in a polymer, thus manufacturing a styrene-based polymer which contains a specified amount of cyclic structured trimers containing, in the molecule, at least one unit each of a styrenic monomer unit and a (meth)acrylate ester monomer unit (hereinafter abbreviated as "co-reacted cyclic trimer").

"Trimer" here is composed of three units in total including styrene monomer unit(s) or (meth)acrylate ester monomer unit(s). "Cyclic" means to have a skeletal structure of tetralin in the molecule. Each of these cyclic trimers has various structural formulas and each of them has stereo isomers thereof, which can be separated and detected in an analysis with gas chromatography or liquid chromatography.

A styrene-based polymer containing a specified amount of co-reacted cyclic trimers obtained by the present invention provides remarkably improved thermal and processing stabilities. The trimer structure control method and the effect brought about by controlling and achieving the content of trimers having such a structure have not been known before at all. Although the mechanisms of the reaction of the trimer structure control and the expression of the effect by the trimer structure control are not sufficiently clarified, it is thought as follows.

In the production of a styrene-based polymer, a styrene molecule (diene structure) and other styrene molecule (olefin structure) form a cyclic dimer, for example, 1-phenyl-2,3-dihydronaphthalene, by a Diels-Alder type reaction. This type of cyclic dimer further reacts with one styrene molecule to give a styrene trimer. Therefore, a conventional polystyrene resin or a high impact polystyrene resin contains 5,000 to 20,000 ppm of cyclic styrene trimers (mainly 1-phenyl-4-(1-phenylethyl)tetralin), depending on a manufacturing method. These cyclic styrene trimers easily generate a radical by thermal decomposition, which mainly lowers the stability of a styrene polymer.

In a method for manufacturing the styrene-based polymer of the present invention, a small amount of (meth)aclylate ester should be present together at any time during the polymerization. This monomer has a higher rate of addition reaction than styrene in generation of a cyclic dimer or a cyclic trimer. Then, a stable trimer is formed by the addition of two molecules of styrene and one molecule of (meth) aclylate ester or the addition of one molecule of styrene and two molecules of (meth)aclylate ester. Therefore, the amount of a trimer composed of three molecules of styrene in a styrene-based polymer becomes extremely low as compared to the composition of the monomers fed. Consequently, a styrene-based polymer obtained by the manufacturing method of the present invention shows surprisingly high thermal and processing stabilities as compared to those of the conventional styrene polymers.

Now, specific structural examples of a cyclic trimer having the skeletal structure of tetralin are mentioned below. Hereinafter, trimers composed of styrene and an alkyl acrylate ester, which are used as specific examples of a styrenic monomer and a (meth)aclylate ester, respectively, are mentioned. However, they are only for exemplification and the present invention should not be limited by them. When other styrenic monomers and (meth)aclylate ester monomers are used, it is natural that the corresponding oligomers are generated.

Typical examples of cyclic trimer compound composed of three units of styrene monomer include 1-phenyl-4-(1-phenylethyl) tetralin and 1-phenyl-4-(2-phenylethyl)tetralin.

Then, co-reacted cyclic trimers containing, in the molecule, at least one unit each of styrenic monomer unit and aclylate ester monomer unit are shown below.

Typical examples of cyclic trimer compound composed of two units of styrenic monomer and one unit of acrylate ester monomer include 1-phenyl-4-(1-(alkoxycarbonyl)ethyl) tetralin, 1-phenyl-4-(2-(alkoxycarbonyl)ethyl)tetralin, 1-(1-phenylethyl)-4-(alkoxycarbonyl)tetralin and 1-(2-phenylethyl)-4-(alkoxycarbonyl) tetralin.

Typical examples of cyclic trimer compound composed of one unit of styrenic monomer and two units of aclylate ester monomer include 1-alkoxycarbonyl-4-(1-(alkoxycarbonyl) ethyl)tetralin and 1-alkoxycarbonyl-4-(2-(alkoxycarbonyl) ethyl)tetralin.

A trimer composed of three units of aclylate ester monomer could not be confirmed.

"Alkoxyl group" here means the alcohol moiety of an acrylate ester.

These cyclic trimers are formed by side reactions of monomers during the manufacturing of a polymer as described above. Oligomers are also formed by the oxidative deterioration, thermal degradation, mechanical decomposition and the like of a polymer after the polymerization. The oligomers thus formed are mainly linear type of oligomers having no cyclic structure (skeletal structure of tetralin) described above.

Among these linear type of trimers, typical examples of linear trimer containing, in the molecule, at least one unit each of styrene monomer unit and aclylate ester monomer unit include 2,4-diphenyl-6-alkoxycarbonyl-1-hexene, 2,6-diphenyl-4-alkoxycarbonyl-1-hexene, 4,6-diphenyl-2-alkoxycarbonyl-1-hexene, 2-phenyl-4,6-bis (alkoxycarbonyl)-1-hexene, 4-phenyl-2,6-bis (alkoxycarbonyl)-1-hexene and 6-phenyl-2,4-bis (alkoxycarbonyl)-1-hexene.

Further, a styrene-based polymer further contains a small amount of linear trimer-like compound with a monomer unit composition that does not correspond to the number of the constitutional monomer units. For example, linear trimers in which double bond is saturated (hydrogenated) or linear trimers which lack one carbon atom may be present, though the name of specific compounds are not shown here.

These linear trimers and linear trimer-like compounds are oligomer-related compounds which are formed by a decomposition of a polymer after the polymerization. They do not significantly influence on the thermal and processing stabilities of a styrene-based polymer resin, and basically do not depend on polymerization conditions.

The method for manufacturing the styrene-based polymer of the present invention is principally characterized with that a styrenic monomer is polymerized in the co-existence of a (meth)acrylate ester monomer at any time during the polymerization.

Styrenic monomer may contain, in addition to styrene, a small amount of known vinyl aromatic monomer. Examples of the vinyl aromatic monomer includes α-methylstyrene, o-methylstyrene, m-methylstyrene, p-methylstyrene, p-tert-butylstyrene and a mixture thereof.

"(Meth)acrylate ester monomer" means a monomer selected from an acrylate ester monomer and a methacrylate ester monomer. Specifically, it is selected from an ester compound between an alcohol with 1–8 carbon atoms and acrylic acid or methacrylic acid. More specifically, said ester compound includes methyl acrylate, ethyl acrylate, isopropyl acrylate, n-butyl acrylate, n-pentyl acrylate, n-hexyl acrylate, cyclohexyl acrylate, methyl methacrylate, ethyl methacrylate, isopropyl methacrylate, n-butyl methacrylate, n-pentyl methacrylate, n-hexyl methacrylate and cyclohexyl methacrylate.

Further, these (meth)acrylate ester monomers may be used in combination of two or more kinds. In particular, when methyl methacrylate is used, combined use with other (meth)acrylate ester(s) is preferable to adjust the softening point of the styrene-based polymer obtained, in an application requiring low temperature processing.

In view of a balance among low temperature processing performance, weather resistance and strength, a (meth)

acrylate ester monomer is preferably an acrylate ester monomer. The acrylate ester monomer can suppress the formation of a styrene trimer and increase the formation of a co-reacted cyclic trimer in a less amount than the methacrylate ester monomer can.

Methyl acrylate, ethyl acrylate, isopropyl acrylate and n-butyl acrylate are more preferable, and n-butyl acrylate is most preferable. In those applications requiring low temperature processing, such as stretched sheet and stretched film, physical properties and processing characteristics of a styrene-based polymer resin can be improved on a good balance by using n-butyl acrylate.

Further, a monomer used in the method for manufacturing the styrene-based polymer of the present invention may contain other copolymerizable vinyl monomer(s) in a range not so as to impair the object of the present invention. Preferable specific examples of such monomers include acrylic acid, methacrylic acid and salts thereof, and further α,β-unsaturated carboxylate esters.

The composition of monomers used in the method for manufacturing the styrene-based polymer of the present invention is such that a styrene monomer is in a range of 60 to 97% by weight, preferably in a range of 65 to 95% by weight, more preferably in a range of 70 to 93% by weight, and most preferably in a range of 75 to 90% by weight, and the remaining component is a (meth)acrylate ester monomer.

A styrene monomer less than 60% by weight is not preferable because the thermal resistance of the styrene-based polymer obtained is excessively lowered. More concretely, such a lower styrene content is not preferable because it tends to cause thermal deformation of molded articles and natural shrinkage of stretched film. On the other hand, a styrene monomer over 97% by weight is not preferable, either, because such a higher styrene content reduces a suitable range of cold draw temperature for a sheet or film from the obtained styrene-based polymer and lowers strength performance such as folding characteristics of a sheet or film therefrom. With a decrease in the amount of a (meth)acrylate ester monomer introduced, the amount of cyclic styrene trimer increases, thus resulting in undesirable lowering of thermal and processing stabilities.

The amount of a (meth)acrylate ester monomer introduced is preferably not less than 30% by weight, more preferably not less than 50% by weight, and most preferably not less than 80% by weight. As an acrylate ester, n-butyl acrylate is particularly preferable. Use of n-butyl acrylate can increase the content of co-reacted cyclic trimers in cyclic trimers, and further improve thermal and processing stabilities of a styrene-based polymer obtained.

Another effect attained by the method for manufacturing the styrene-based polymer of the present invention, is to highly efficiently manufacture a styrene-based polymer containing co-reacted cyclic trimers in a specified range of amount.

The method for manufacturing the styrene-based polymer of the present invention comprises the steps of continuously feeding raw materials into one end of two or more polymerization vessels connected in series; polymerizing a styrenic monomer in the coexistence of a (meth)acrylate ester monomer by using an organic radical generating agent as an initiator by a mass or a solution polymerization method of continuous process; and continuously taking out a product from another end of said polymerization vessels.

Further, the polymerization process is preferably such that two or more polymerization vessels are connected in series and the mixing state in the final polymerization vessel shows a plug flow. Most preferably, the process comprises a complete mixing type of polymerization vessel in the former stage and a plug flow type of polymerization vessel in the latter stage. This process enables to attain a high polymerization conversion efficiently, while maintaining thermal and processing stabilities of a styrene-based polymer obtained. It is also preferable that polymerization vessels are connected in parallel in a part of the process, in view of the broadening or adjusting of molecular weight distribution or the compositional distribution of a polymer.

Specific shape of each polymerization vessel is not particularly limited so long as it attains the mixing state. For example, the complete mixing type of polymerization vessel may be a tank reactor equipped with an agitator and with sufficient mixing ability in the vertical direction. For example, the plug flow type of polymerization vessel may be a tower-like polymerization vessel with less vertical stirring, a static mixer or simply a temperature-controlled pipeline.

In the polymerization of a styrene-based polymer by a batch polymerization process, a monomer composition varies during the polymerization based on a difference in copolymerization reactivities of a styrene monomer and a (meth)acrylate ester monomer. As a result, the distribution of a polymer composition becomes broader. In addition, if the concentration of the remaining (meth)acrylate ester monomer is decreased due to a difference in copolymerization reactivities, the amount of cyclic styrene trimers formed increases. This results in reduction of improvement effect in thermal and processing stabilities of the styrene-based polymer resin obtained, and also deteriorates specific characteristics of resins, for example, low temperature processing characteristics such as elongation in low temperature sheeting. Thus, the batch polymerization process is not preferable.

The volume of each polymerization vessel, when two or more vessels are connected, is not particularly limited. The total volume of all polymerization vessels depends on polymerization temperature and feed rates of raw materials. It is a volume to attain a sufficient residence time required for polymerization of preferably not less than 60% by weight, more preferably not less than 70% by weight and most preferably not less than 80% by weight of monomers based on the total feed monomers.

The volume of each polymerization vessel depends on a mixing state in each vessel, but preferably there should be no extreme difference among the vessels used. The connection of a polymerization vessel with extremely small volume relative to volumes of other reactor vessels reduces the effect of the connection of polymerization vessels in series.

In particular, when the mixing state in the final polymerization vessel is a plug flow, the ratio in volume of the final vessel is preferably 5 to 80%, more preferably 10 to 60% based on the total volume of all polymerization vessels.

Further, it is preferable to feed monomers in portions at two or more positions of polymerization vessels connected in series, in view of controlling the concentration of (meth)acrylate ester based on the total monomers at each part of the polymerization vessels. The raw materials can be fed at one position or two or more positions in portions with each composition of raw materials adjusted, respectively.

In the method for manufacturing the styrene-based polymer of the present invention, the concentration of (meth)acrylate ester monomer is required to be controlled so as to exceed 1% by weight, preferably 2% by weight, more preferably 3% by weight, and most preferably 5% by weight, based on the total monomers, at every positions of the polymerization vessels and at any points of time of the polymerization. Remarkable decrease of the concentration of co-existing (meth)acrylate ester monomer increases the amount of cyclic styrene trimer formed, thus resulting in failure of attaining the object of the present invention. An uniform concentration of a co-existing (meth)acrylate ester monomer can be attained by feeding the monomer in portions at the position where the concentration becomes low, or by creating partially a backward mixing flow against the flow of the polymerization liquid.

In the method for manufacturing the styrene-based polymer of the present invention, an organic radical generating agent is used as an initiator. The organic radical generating agent includes organic peroxides and azo compounds. Particularly preferable organic radical generating agents are organic peroxides.

Preferably, kind of the organic peroxide can be selected from compounds having a half life from 10 minutes to 10 hours at the polymerization temperature employed. More preferably an organic peroxide is selected from those having a half life of 10 hours in a range of 50 to 130° C., and most preferably in a range of 80 to 120° C., although the temperature range depends on the polymerization temperature.

Specific organic peroxides include, for example, octanoyl peroxide, lauryl peroxide, stearyl peroxide, 1,1,3,3-tetramethybutylperoxyl 2-ethylhexanoate, succinic peroxide, 2,5-dimethyl-2,5-di(2-ethylhexanoylperoxy) hexane, 1-cyclohexyl-1-methylethylperoxy 2-ethylhexanoate, t-hexylperoxy 2-ethylhexanoate, 4-methylbenzoyl peroxide, t-butylperoxy 2-ethylhexanoate, m-toluol peroxide, benzoyl peroxide, t-butylperoxy isobutylate, 1,1-bis(t-butylperoxy) 2-methylhexanoate, 1,2-bis(t-hextylperoxy) cyclohexanoate, 1,1-bis(t-butylperoxy)-3,3,5-trimethylcyclohexane, 1,1-bis(t-butylperoxy) cyclohexane, 2,2-bis(4,4-dibutyl-peroxycyclohexyl) propane, 1,1-bis(t-butylperoxy)-cyclododecane, t-hexylperoxy isopropylmonocarbonate, t-butylperoxymaleic acid, t-butylperoxy 3,5,5-trimethylhexanoate, t-butylperoxy laurate, 2,5-dimethyl-2,5-di(m-toluolperoxy)hexane, t-butylperoxy isopropylmonocarbonate, t-butylperoxy 2-ethylhexylmonocarbonate, t-hexylperoxy benzoate, 2,5-dimethyl-2,5-di(benzoylperoxy)hexane, t-butylperoxy acetate, 2,2-bis(t-butylperoxy)butane, t-butylperoxy benzoate, n-butyl-4,4-bis(t-butylperoxy)valerate, di-t-butylperoxy isophthalate, α,α'-bis(t-butylperoxy) diisopropylbenzoate, dicumyl peroxide, 2,5-dimethyl-2,5-di (t-butylperoxy)hexane, t-butylcumyl peroxide, di-t-butylperoxide, p-menthane hydroperoxide and 2,5-dimethyl-2,5-(t-butylperoxy)hexyn-3.

Most preferable organic peroxides are 1,1-bis(t-butylperoxy)cyclohexane and 1,1-bis(t-butylperoxy)-3,3,5-trimethylcyclohexane.

The amount of an organic radical generating agent to be used is in a range of preferably 5 to 5,000 ppm, more preferably 50 to 2,000 ppm, and most preferably 100 to 1,000 ppm, based on the total monomers. When the amount of an organic radical generating agent used is less than 5 ppm, the amount of co-reacted cyclic trimers formed remarkably increases probably because a thermal radical polymerization progresses along with an initiator-induced radical polymerization. In this case, the weather resistance, thermal and processing stabilities and strength performance of the styrene-based polymer resin obtained are undesirably deteriorated. To the contrary, when the amount of an organic radical generating agent used is over 5,000 ppm, a disadvantage in cost occurs and the polymerization reaction becomes unstable.

In the polymerization, a chain transfer agent or a molecular weight modifier may be used. The chain transfer agent or molecular weight modifier can be selected from the known chain transfer agents or molecular weight modifiers in the manufacturing of styrene polymers. Specific compounds thereof include halogenated organic compounds such as carbon tetrachloride; mercaptan compounds such as dodecylmercaptan; hydrocarbon compounds with an active hydrogen atom at the α-carbon of a benzene ring such as α-methylstyrene dimer. Most preferable compound is α-methylstyrene dimer.

The method for manufacturing the styrene-based polymer of the present invention is carried out without any solvent used or with a small amount of organic solvent used. A preferable organic solvent is selected from those organic compounds which can dissolve a styrene-based polymer obtained; have a low reactivity with radicals during the polymerization reaction; and can be easily removed by heating after the polymerization. Preferable examples include aromatic hydrocarbons and cyclic aliphatic hydrocarbons with 6–10 carbon atoms. More specifically, toluene, xylene, ethylbenzene, cyclohexane, ethylcyclohexane and a mixture thereof are included. Linear aliphatic hydrocarbons may be contained partially.

The amount of a polymerization solvent to be used is preferably not higher than 200 parts by weight, more preferably not higher than 100 parts by weight and most preferably not higher than 50 parts by weight, based on 100 parts by weight of a styrene-based polymer.

In the manufacturing of the styrene-based polymer of the present invention, the major polymerization temperature is preferably 70 to 150° C., more preferably 80 to 140° C., and most preferably 90 to 130° C. Here, the "major polymerization temperature" means the temperature at which polymerization of at least 50% by weight, preferably 70% by weight and most preferably 90% by weight proceeds with respect to the polymer obtained.

As long as the major polymerization temperature is controlled within the above range, a temperature to polymerize a part of polymer may be out of the range. For example, in a system where several polymerization vessels are connected in series, a part of polymerization in the initial stage or a latter stage may be performed at a temperature out of the range. Further, in a system where several polymerization vessels are connected in parallel, it may be preferable to perform a polymerization in some part of vessels at a controlled temperature out of the range.

In more detail, for a certain purpose it is preferable to perform a polymerization at a temperature out of the above temperature range, in order to complete the polymerization in a latter stage. In addition, when cooled raw materials are fed continuously to assist cooling of a polymerization vessel, a temperature at a part of polymerization zone may be below the temperature range.

Too high a major polymerization temperature is not preferable, because it increases the amount of cyclic styrene trimers formed and lowers the thermal and processing stabilities of the styrene-based polymer obtained. To the contrary, too low a major polymerization temperature is not preferable, either, because it greatly increases the viscosity of polymerization liquid. The increasing viscosity makes the mixing of the liquid in a polymerization vessel difficult or lowers the polymerization rate.

In the method for manufacturing the styrene-based polymer of the present invention, the polymerization conversion is controlled preferably at not lower than 60% by weight, more preferably not lower than 70% by weight and most preferably not lower than 80% by weight. A higher conversion is naturally preferable in view of productivity. A polymerization conversion lower than 60% by weight is not preferable because of low productivity and excessive load in a facility and energy required for a devolatilization step. Further, it also tends to cause a problem in the quality and odor of a polymer obtained, because of incomplete removal of a solvent or unreacted monomers in the devolatilization step.

In the method for manufacturing the styrene-based polymer of the present invention, the polymer is recovered by devolatilizing or removing the unreacted monomers and the polymerization solvent contained. Method for devolatilizing or removing the unreacted monomers and the polymerization solvent is not particularly limited, and known methods used in the manufacture of the conventional styrene polymers such as use of an extruder equipped with vent or a flash vessel can be utilized.

Average temperature of the polymer in the devolatilization step is in a range of preferably 180 to 250° C., more preferably 190 to 240° C., and most preferably 200 to 230° C. Too low a devolatilization temperature is not preferable due to increase of the content of the residual monomers in a polymer. To the contrary, too high a devolatilization temperature is not preferable, either, because it induces thermal decomposition of a polymer. However, in some case, it may be preferable to conduct the devolatilization at a temperature out of the above range in the final stage of the devolatilization for a short period, in order to suppress thermal decomposition and effectively reduce the amount of the residual monomers in the styrene-based polymer obtained.

The degree of vacuum in the devolatilization step, although normal pressure may be employed, is preferably not higher than 50 torr, more preferably not higher than 20 torr. Increased degree of vacuum (lower absolute pressure) is preferable because devolatilization efficiency is increased even at a lower polymer temperature. However, there is naturally a limit to increasing the degree of vacuum itself in view of the capacity of a vacuum pump or a condensing equipment. Usually, a pressure of not less than 5 torr is employed.

Further, preferably after a styrene-based polymer is once subjected to a devolatilization in a series of devolatilization steps, a volatile substance such as water, alcohol or carbon dioxide gas, which is not dissolved in the polymer, is introduced into the polymer with a pressure applied. And it simultaneously devolatilize volatile components together. As the result, the volatile components are more removed.

The second object of the present invention is to provide a novel styrene-based polymer resin. Namely, the present invention provides a styrene-based polymer resin containing, as the main component, a styrene-based polymer obtained by the steps of continuously feeding raw materials into one end of two or more polymerization vessels connected in series; polymerizing a styrenic monomer in the coexistence of a (meth)acrylate ester monomer by using an organic radical generating agent as an initiator by a mass or solution polymerization method of continuous process; and continuously taking out a product from another end of said polymerization vessels, wherein said styrene-based polymer has features shown by the following items (a') to (d'):

(a') monomer units composing said styrene-based polymer are in ranges of 60 to 97% by weight of a styrenic monomer unit(s) and 3 to 40% by weight of a (meth)acrylate ester monomer unit(s);

(b') weight average molecular weight of said styrene-based polymer is 150,000 to 550,000;

(c') said styrene-based polymer contains, in a range of 1,000 to 10,000 ppm, a ring-structured trimer containing at least one unit each of styrenic monomer unit and (meth) acrylate ester monomer unit in a molecule; and (d') Vicat softening point of said styrene-based polymer is in a range of 50 to 99° C.

Monomer units composing the styrene-based polymer in the styrene-based polymer resin of the present invention are a styrenic monomer unit in a range of 60 to 97% by weight, preferably 65 to 95% by weight, more preferably 70 to 93% by weight, and most preferably 75 to 90% by weight, and a (meth)acrylate ester monomer as the remainder. A styrenic monomer unit of less than 60% by weight is not preferable because the heat resistance of the styrene-based polymer obtained becomes too low. More specifically, such a low content is not preferable because it tends to cause thermal deformation of molded articles and natural shrinkage of stretched film. To the contrary, a styrenic monomer unit of over 97% by weight is not preferable, either, because it remarkably restricts an appropriate range of temperature for cold draw of sheets or films of the styrene-based polymer obtained, and lowers strength characteristics such as folding resistance of sheets or films.

The weight average molecular weight of a styrene-based polymer in the styrene-based polymer resin of the present invention is in a range of 150,000 to 550,000, preferably 180,000 to 500,000, and most preferably 200,000 to 450,000.

A weight average molecular weight of a styrene-based polymer of lower than 150,000 is not preferable because it remarkably reduces strength characteristics, in particular, tear strength and tensile strength of the styrene-based polymer resin obtained. To the contrary, a weight average molecular weight of a styrene-based polymer of over 550,000 is not preferable, either, because it remarkably reduces the moldability of the styrene-based polymer resin obtained.

The ratio of weight average molecular weight/number average molecular weight is preferably in a range of 1.5 to 3.9 and particularly preferably 1.8 to 3.2. Too narrow a molecular weigh distribution is not preferable because it causes a difficulty in processing, in particular, in high ratio stretching of a film and sheet of the styrene-based polymer resin. To the contrary, too broad a molecular weigh distribution is not preferable, either, because it reduces strength characteristics, for example, tensile strength or surface hardness of the styrene-based polymer resin.

MFR (measured in accordance with ISO R1133 under conditions of 200° C. and 5 kgf of load) is preferably in a range of 1 to 20 g/10 minutes and more preferably 2 to 15 g/10 minutes. When MFR is set in this range, uneven thickness of a sheet and film obtained by molding a styrene-based polymer and molded articles obtained by further subjecting to a secondary processing, is diminished. Processing under a high stretching ratio is desirably facilitated at low temperatures; and strength characteristics are improved.

The co-reacted cyclic trimer, which is contained in the styrene-based polymer of the styrene-based polymer resin of the present invention, is a trimer having, in the molecule, at least one unit each of styrene monomer unit and (meth) acrylate ester monomer unit and a skeletal structure of tetralin. Typical examples of this trimer include 1-phenyl- 4-(1-(alkoxycarbonyl)ethyl) tetralin, 1-phenyl-4-(2-(alkoxycarbonyl)ethyl)tetralin, 1-phenyl-4-(1-(alkoxycarbonyl)ethyl)tetralin, 1-(1-phenylethyl)-4-(alkoxycarbonyl)tetralin, 1-alkoxycarbonyl-4-(1-(alkoxycarbonyl)ethyl)tetralin and 1-alkoxycarbonyl-4-(2-(alkoxycarbonyl)ethyl)tetralin.

In particular, when the (meth)acrylate ester monomer unit is a butyl acrylate monomer unit, specific examples of the co-reacted cyclic trimer include 1-phenyl-4-(1-(n-butoxycarbonyl)ethyl)tetralin, 1-phenyl-4-(2-(n-butoxycarbonyl)ethyl)tetralin, 1-phenyl-4-(1-(n-butoxycarbonyl)ethyl)tetralin, 1-(1-phenylethyl)-4-(n-butoxycarbonyl)tetralin, 1-n-butoxycarbonyl-4-(1-(n-butoxycarbonyl)ethyl)tetralin and 1-n-butoxycarbonyl-4-(2-(n-butoxycarbonyl)ethyl)tetralin.

The content of co-reacted cyclic trimer is in a range of 1,000 to 10,000 ppm and preferably 1,000 to 6,500 ppm. By controlling the content of co-reacted cyclic trimer to be not lower than 1,000 ppm, remarkably great practical advantages can be obtained. For example, thermal and processing stabilities of the styrene-based polymer resin are remarkably improved; rework of the styrene-based polymer resin becomes easy; and molding conditions can be greatly widened. However, an excessively high content of a co-reacted cyclic trimer(s) is not preferably because of natural shrinkage, lowered strength characteristics of sheets and films of the styrene-based polymer resin, and further contamination of a mold or a die during molding.

In addition, the content of a cyclic styrene trimer composed only of styrenic monomer unit which is contained in the styrene-based polymer, is preferably not higher than 3,000 ppm, more preferably not higher than 2,000 ppm, and most preferably not higher than 1,000 ppm. Higher content of cyclic styrene trimer is not preferable because of a tendency to lower thermal and processing stabilities.

The content of styrenic monomer which is contained in the styrene-based polymer of the styrene-based polymer resin of the present invention is preferably less than 500 ppm, more preferably less than 300 ppm, particularly preferably less than 200 ppm, and most preferably less than 100 ppm. The content of styrenic monomer of not lower than 500 ppm is not preferable because of a tendency to contaminate a mold or a nozzle during a molding process and poor printability on the surface of a molded article.

The content of (meth)acrylate ester monomer which is contained in the styrene-based polymer of the styrene-based polymer resin of the present invention is preferably less than 500 ppm, more preferably less than 300 ppm, still more preferably less than 200 ppm, and most preferably less than 100 ppm. A content of (meth)acrylate ester monomer of not lower than 500 ppm is not preferable because of lowered weather resistance and, in some cases, an odor problem of a resin obtained.

Softening point, which is defined by Vicat softening point, of the styrene-based polymer resin of the present invention is in a range of 50 to 99° C., preferably 55 to 95° C., and most preferably 60 to 90° C. Too low a softening point is not preferable because of a large natural shrinkage ratio and lowered strength of stretched sheet and film. To the contrary, too high a softening point makes the polymer brittle because of reduced flexibility thereof, and also remarkably lowers low temperature processing characteristics. Higher processing temperature enables sheeting, stretching and further (secondary) processing. But the high softening point is not preferable because it narrows the range of appropriate temperatures for processing operation.

The styrene-based polymer resin of the present invention may contain, in addition to the styrene-based polymer, various known additives used in a polystyrene resin, such as stabilizer, antioxidant, ultraviolet absorber, lubricant, mold releasing agent, plasticizer, dye, pigment and various fillers to attain the similar effects.

The third object of the present invention is to provide the following novel resin composition containing said styrene-based polymer resin. Namely, the present invention provides a styrene-based polymer resin composition comprising:

(A) 5 to 95% by weight of a styrene-(meth)acrylate ester copolymer resin;

(B) 95 to 5% by weight of a styrene-conjugated diene block copolymer; and (C) 0 to 30% by weight of a polymer compatible to said styrene-based polymer or said styrene-based polymer resin of the above (A) or (B); wherein, component (A) is the above-mentioned styrene-(meth)acrylate ester copolymer resin; the styrene-conjugated diene block copolymer of component (B) has characteristics of the following items (e') to (g'); and further said styrene-based polymer resin composition has characteristics of the following items (h') and (i'):

(e') said styrene-conjugated diene block copolymer is composed of at least two styrene-based polymer blocks and at least one conjugated diene polymer block;

(f') a content of a styrenic monomer unit composing said styrene-conjugated diene block copolymer is 40-95% by weight;

(g') a content of a conjugated diene monomer unit composing said styrene-conjugated diene block copolymer is 60 to 5% by weight;

(h') Vicat softening point of said styrene-based polymer resin composition is in a range of 50 to 99° C.; and (i') total transmittance of 1 mm-thick plate of said styrene-based polymer resin composition is not less than 75%.

The component (B) composing the styrene-based polymer resin composition of the present invention is a styrene-conjugated diene block copolymer having at least two blocks composed of a styrene monomer unit as the main component, and at least one block of a conjugated diene monomer unit as the main component.

Specified block structures of the styrene-conjugated diene block copolymer are, for example, linear block copolymers represented by the general formulas (1) to (3) and radial block copolymers represented by the general formulas (4) to (7).

$(A-B)_nA$        (1)

$(A-B)_m$        (2)

$(B-A)_mB$        (3)

$[(A-B)_n]_m-X$        (4)

$[(B-A)_{n-1}]_m-X$        (5)

$[(A-B)_n-A]_m-X$        (6)

$[(B-A)_n-A]_m-X$        (6)

wherein, A is a block containing a styrene monomer unit as the main component with a number average molecular weight in a range of 5,000 to 200,000; each of A may have the same structure or different structure; B is a block containing a conjugated diene monomer unit as the main component with a number average molecular weight in a range of 10,000 to 500,000; each of B may have the same structure or different structure; X is a polyfunctional coupling agent; n is an integer of 1 to 3; m is an integer of 2 to 4; in view of the gist of the present invention, the block sequence structures of B-X-B and A-X-A should not be regarded as being divided into several blocks, but as being a single block as far as the requirement of the molecular weight of the block in the present invention is met, even if the polyfunctional coupling agent X is present between the block sequences.

Further, said styrene-conjugated diene block copolymer may contain an incomplete block copolymer which does not meet the above-mentioned requirement of the block sequence structure, such as a homopolymer of A, a homopolymer of B or an A-B di-block copolymer, so far as it does not impair the effects of the present invention. In addition, a gradient part where a copolymer composition varies gradually may also be contained between, block A and block B.

Block A is a block containing a styrene monomer unit as the main component, but may contain a small amount of other copolymerizable monomer, such as a monomer unit consisting of a vinyl aromatic compound other than styrene or a conjugated diene.

Block B is a block containing a conjugated diene monomer unit as the main component, but may contain a small amount of other copolymerizable monomer, such as a monomer unit consisting of a vinyl aromatic hydrocarbon. Most preferable conjugated diene is butadiene and/or isoprene.

The content of a styrenic monomer unit in said styrene-conjugated diene block copolymer is in a range of 40 to 95% by weight. The content of a conjugated diene monomer unit is in a range of 60 to 5% by weight. The content of a styrenic monomer unit is preferably in a range of 50 to 90% by weight and most preferably 60 to 85% by weight, and the rest component is a conjugated diene monomer unit. Here, "styrenic monomer unit" collectively means monomer units composed of styrene and other vinyl aromatic compounds.

The weight average molecular weight of said styrene-conjugated diene block copolymer is in a range of 40,000 to 400,000, preferably 50,000 to 300,000 and more preferably 60,000 to 200,000.

Too low a molecular weight is not preferable because the mechanical strength of the styrene-based polymer resin composition obtained is low. To the contrary, too high a molecular weight is also not preferable because a homogeneous styrene-based polymer resin composition becomes difficult to obtain due to lowered processability and mixing ability or lowered dispersibility of the polymer component.

Said styrene-conjugated diene block copolymer can be manufactured by known methods. For example, it can be manufactured by sequential block copolymerization of a styrenic monomer and a conjugated diene monomer in a batch process or a continuous polymerization process using an organolithium initiator in a hydrocarbon solvent. Alternatively, it can be manufactured by forming a block copolymer with a radial structure using a coupling reaction at an active lithium terminal after the copolymerization. Specific manufacturing methods for a styrene-conjugated diene block copolymer include, for example, the techniques disclosed in JP-B-45-19388 and JP-B-47-43618.

A solvent usable in polymerization is a hydrocarbon solvent which is fundamentally inactive to an organolithium initiator; can dissolve monomers and a polymer formed; includes such solvents that retains a liquid state during the polymerization; and can be easily removed by devolatilization in a solvent removal process after the polymerization. Preferably, for example, alicyclic hydrocarbon solvents with 5 to 9 carbon atoms, aliphatic hydrocarbon solvents with 5 to 9 carbon atoms and aromatic solvents with 6 to 9 carbon atoms are used. More preferably, alicyclic hydrocarbon solvents with 5 to 9 carbon atoms can be used. More specifically, the solvent includes cyclohexane, methylcyclohexane, methylcyclopentane, cyclohexene and a mixture thereof. Further, mixing of an ether compound or a tertiary amine compound can improve the polymerization activity of the organolithium initiator to the monomers. The amount of a polymerization solvent to be used is in a range of preferably 1 to 20 Kg, more preferably 2 to 10 Kg, and most preferably 3 to 5 Kg, based on 1 Kg of monomers.

The polymerization temperature is controlled in a range of preferably 0 to 130° C., more preferably 10 to 120° C. and most preferably 20 to 110° C. The polymerization temperature in a batch process is preferably controlled in this range, although the polymerization of each block is conducted at an adiabatically elevated temperature. Too low a polymerization temperature is not practical because the reaction rate is reduced. To the contrary, too high a polymerization temperature is not preferable, either, because the block structure of the styrene-conjugated diene block copolymer becomes imperfect due to deactivation of a living lithium terminal and various strength characteristics of the styrene-based polymer resin composition obtained are reduced.

After the completion of polymerization, a polymer is recovered by devolatilizing and removing unreacted monomers or a polymerization solvent. A method for devolatilizing and removing unreacted monomers or a polymerization solvent is not particularly limited, and known methods used in manufacturing the conventional styrene-based polymer resins or rubbers can be utilized, such as a double drum dryer, steam stripping by dispersing in water, an extruder equipped with vent and a flash vessel.

Volatile components are removed by devolatilization generally at 100 to 250° C., preferably at 120 to 200° C. under a degree of vacuum of preferably 0 to normal pressure, more preferably 100 Pa to 50 KPa, although the conditions depend on the amount and volatility of residual monomers or a solvent. A method of connecting a plurality of devolatilization systems in series is effective to obtain a high degree of devolatilization. Such a method is also preferably used that water is added between the first and the second stages to enhance the devolatilization ability of the second stage.

Component (C) composing the styrene-based polymer resin composition of the present invention is a polymer compatible to the styrene-based polymer or the styrene-based polymer resin of the above-described (A) or (B). Specifically, it includes a polymer of styrene, a copolymer of styrene and a monomer copolymerizable with styrene, high impact polystyrene, polyphenylene ether, a styrene-butadiene random copolymer and various petroleum resins.

The styrene-based polymer resin composition of the present invention consists of:

(A) 5 to 95% by weight of a styrene-(meth)acrylate ester copolymer resin;

(B) 5 to 95% by weight of a styrene-conjugated diene block copolymer; and (C) 0 to 30% by weight of a polymer compatible to said styrene-based polymer or said styrene-based polymer resin shown by the above (A) or (B).

The content of component (A) is in a range of 5 to 95% by weight, preferably 20 to 90% by weight, more preferably 30 to 85% by weight, and most preferably 50 to 80% by weight. A content of less than 5% by weight is less suitable for applications such as heat shrink film, because an effect of the combined use is not exhibited and the rigidity of the styrene-based polymer resin composition obtained is insufficient, although depending on an application thereof. To the contrary, a content of over 95% by weight is not preferable, either, because a film becomes stiff and brittle.

The content of component (B) is in a range of 5 to 95% by weight, preferably 5 to 80% by weight, more preferably 10 to 70% by weight, and most preferably 20 to 50% by weight. A content in this range can remarkably improve characteristics such as brittleness, flexibility and elongation, in which a resin made only of component (A) is inferior.

The content of component (C) is in a range of 0 to 30% by weight, preferably 0 to 20% by weight, and more preferably 0 to 10% by weight. Mixing of component (C) can improve balance among softening point, rigidity and fluidity, and adjust the performance of a styrene-based polymer resin composition corresponding to each purpose.

The styrene-based polymer resin composition of the present invention is composed of (A) a styrene-(meth) acrylate ester copolymer resin, (B) a styrene-conjugated diene block copolymer, and, if necessary, (C) a polymer compatible to the styrene-based polymer or the styrene-based polymer resin of the above-described (A) or (B), but it is not necessarily limited to these components. For example, various additives generally used in styrene-based resins, such as stabilizer, antioxidant, ultraviolet absorber, lubricant, mold releasing agent, plasticizer, dye, pigment and various fillers can be added to attain the same known effects as shown in a polystyrene resin.

Further, in using said composition as a film, additives generally used in a film application, such as antistatic agent, antifog agent and inorganic powder, may be added.

As an antioxidant, a phenol type or a phenol acrylate type (for example, 2-tert-butyl-6-(3'-tert-butyl-5'-methyl-2'-hydroxybenzyl)-4-methylphenyl acrylate and derivatives thereof) is preferable. In addition to the above, it is more preferable to use a phosphorous type of antioxidant (for example, tri(2,4-di-tert-butyl)phenylphosphite and tri(4-nonyl)phenylphosphite). Furthermore, in addition to the above two types, it is sometimes preferable to add a sulfur-containing antioxidant. These compounds may be used alone or in combination.

The amount of each antioxidant added is 0.01 to 5.0 parts by weight, preferably 0.05 to 3.0 parts by weight, more preferably 0.1 to 2.0 parts by weight, and most preferably 0.2 to 1.0 parts by weight, based on 100 parts by weight of the mixed resin. An amount of less than 0.01 parts by weight is not preferable, because the preventive effect of thermal degradation of a resin (for example, crosslinking or decrease in molecular weight) is not exhibited, which an amount of over 5.0 parts by weight is not preferable, either, because it causes problems such as poor dispersion, decrease in strength, decrease in transparency, and a high cost.

The antistatic agents are preferably of amine type and amide type. For example, amine type of compounds such as a hydroxyethyl-alkylamine and derivatives thereof and amide type of compounds such as amide of a hydroxyethyl fatty acid and derivatives thereof can be preferably used.

The amount of an antistatic agent added is 0.1 to 5 parts by weight, preferably 0.2 to 3.0 parts by weight, and more preferably 0.4 to 2.0 parts by weight, based on 100 parts by weight of a resin. An amount of less than 0.1 parts by weight makes it difficult to obtain an antistatic effect, while an amount of over 5 parts by weight causes problems of losing gloss on the surface of molded article and reducing printability.

In addition, as a plasticizer, acid esters such as DOP, DOA, ATBC and DBS; and liquid paraffins such as mineral oil may be added in a range of 0.1 to 5% by weight, preferably 0.5 to 3% by weight.

In manufacturing the styrene-based polymer of the present invention, the method for mixing each polymer component is not particularly specified. The following methods for mixing are used: mechanical mixing by using various resin processing equipment such as a kneader, a Banbury mixer and an extruder; or solution mixing by dissolving each polymer component in a solvent or a polymer solution in the polymer manufacture.

The Vicat softening point of the styrene-based polymer of the present invention is in a range of 50 to 99° C., preferably 55 to 95° C., and most preferably 60 to 90° C. The Vicat softening point is measured in accordance with ASTM-D1525 with 1 kg load and at a temperature increasing rate of 20° C./min.

For example, in an application to heat shrink film, when shrink property at low temperature is important, the Vicat softening point is preferably about 70° C., and when shrink property at a relatively high temperature is important, it is preferably about 90° C. In a practical use, it is preferable to select a polymer with an optimal Vicat softening point corresponding to the conditions to be used.

Too low a softening point is not preferable and practical because it cause dimensional change or reduction of shrinking force during the storage of a stretched sheet and film at room temperature, and also because strength decreases. To the contrary, too high a softening point reduces the flexibility of a polymer to make it brittle and also remarkably lowers low temperature processing characteristics. In such a case, sheeting or stretching and the subsequent secondary molding processing become possible by increasing the processing temperature, but it is not preferable because the range of appropriate temperatures for heating is narrow and processing operation is difficult.

Total light transmittance for 1 mm-thick plate of the styrene-based polymer resin composition of the present invention is not less than 75%, preferably not less than 80%, and most preferably not less than 85%. One of the remarkably advantageous features of the styrene-based polymer resin composition of the present invention is its transparency. A composition with a total light transmittance of less than 75% cannot be used in an application requiring a transparent resin.

To attain superior transparency, it is required that each of polymer components (A) to (C) is finely dispersed and has a refractive index close to each other. In particular, in the dispersion system of polymer components (A) and (B), the weight average length of particle is preferably not more than 10 $\mu$m, more preferably not more than 5 $\mu$m, and most preferably not more than 1 $\mu$m. In addition, the difference in refractive indices between both components is preferably not more than 0.01, more preferably not more than 0.005, and most preferably not more than 0.002. The difference in refractive indices can be adjusted by the kind and composition of monomers composing the polymers (A) and (B).

One preferable application of the styrene-based polymer resin composition of the present invention is heat shrink film. A heat shrink film is obtained by cold stretching of a sheet or film of the resin composition made of the resin composition. In the present invention, the characteristics and film-forming method thereof are not particularly limited, but in general, the stretching ratio of a heat shrink film in the main stretching direction is in a range of 2.0 to 10.0 times, preferably 2.5 to 8.0 times, while in the orthogonal direction, in a range of 1.1 to 2.5 times, preferably 1.2 to 2.0 times. Further, the stretching ratio between the former and the latter stretching is preferably in a range of 1.8 to 9.1, more preferably 2.0 to 6.7. The stretching temperature depends on a softening point of said styrene-based polymer resin composition, but in general, it is in a range of 60 to 150° C., preferably 70 to 120° C.

The dart impact strength of a heat shrink film of the present invention should be practically at least 5 kg·cm, preferably not lower than 10 kg·cm, more preferably not lower than 20 kg·cm, and most preferably not lower than 30 kg·cm. Dart impact strength of less than 5 kg·cm is not preferable because it causes film break when a film is pulled out (under a tension) on a packaging machine.

The layered structure of a heat shrink film is also not particularly limited. The styrene-based polymer resin composition of the present invention can be utilized as at least one layer of a multilayer film. In this case, the resin composition may be used as at least one layer (surface layer or inner layer) of a multilayer film which is prepared by combining the same kind of resin compositions (the styrene-based polymer resin composition of the present invention) or different kinds of resin compositions (other than the styrene-based polymer resin composition of the present invention). The film thickness depends on an application thereof, but is usually in a range of 5 to 800 $\mu$, preferably 10 to 500 $\mu$, and more preferably 20 to 300 $\mu$.

The method for forming and processing a heat shrink film is not particularly limited. Generally used equipments such as simultaneous biaxial equipment and sequential biaxial equipment, can be employed. For example, a film-forming and stretching equipment represented by a tenter stretching method, a bubble stretching method and a roller stretching method, can be employed.

The styrene-based polymer resin or the styrene polymer resin composition of the present invention can be suitably used for a sheet and film. It can be also, in particular, for various packaging, container materials and heat shrink label materials by further subjecting a film or sheet to a secondary processing. However, application of the styrene-based polymer resin or the styrene-based polymer resin composition of the present invention is not limited to these. It can be used in various fields where the features of the styrene-based polymer resin or the styrene-based polymer resin composition of the present invention are utilized. For example, it can be used for food containers, sundries, miscellaneous goods, parts of OA equipment and parts of light electric appliances, which are prepared articles molded by injection molding or injection blow molding.

Embodiments of the present invention will be explained below more specifically with reference to Examples. However, the present invention should not be limited by these Examples.

1. EXAMPLES OF METHOD FOR MANUFACTURING STYRENE-BASED POLYMER 1-1) Measurement and Analysis Methods Analysis and measurement of the polymerization were performed by the methods shown below.

(1) Measurement of Polymerization Conversion

The concentration of residual monomers in a polymer solution after completion of polymerization was measured by a gas chromatography.

(2) Measurement of the Lowest Ratio of (Meth)acrylate Ester in Polymerization Liquid In a continuous polymerization process, a polymerization liquid was collected at each part of each polymerization vessel at the stage when the polymerization reaction was stabilized. The ratio of a (meth)acrylate ester in the residual monomers was measured by a gas chromatography. The minimal values are shown in Tables.

In a batch polymerization process, the ratio of a (meth)acrylate ester in the polymerization liquid after completion of the polymerization was measured.

(3) Measurement of Component Monomer Unit in Polymer

Component monomer unit was measured by $^{13}$C-NMR to calculate a copolymerization composition based on an area of spectral peak assigned to each monomer unit.

(4) Measurement of Low Molecular Weight Component in Polymer

The contents of a styrenic monomer and a (meth)acrylate ester monomer as low molecular weight components of a styrene-based polymer were measured under the following conditions by gas chromatography.

Measurement Conditions:

Sample preparation: One gram of a polymer was dissolved in 25 ml of dimethylformamide;

Measurement equipment: GC14B made by Shimadzu Corp.;

Column: CHROMAPACK CP WAX 52CB, 100 m, membrane thickness 2 $\mu$m, diameter 0.52 mm;

Column temperature: 110° C. for 10 minutes→temperature increase of 15° C./min→130° C. for 2 minutes;

Charge port temperature: 150° C.;

Detection method: FID;

Detector temperature: 150° C.;

Carrier gas: helium.

(5) Measurement of Content of Co-reacted Cyclic Trimer in Styrene-based Polymer

Oligomer structure was identified by fractionating and analyzing low molecular weight components obtained by solvent extraction, using a liquid chromatography and a gas chromatography. The amount of co-reacted cyclic trimers was calculated from an area of the corresponding trimers, respectively, detected by FID using the gas chromatography.

Measurement Procedure:

A solution sample of a styrene-based polymer resin was measured by a temperature programmed gas chromatography. In addition to a peak of styrene trimer in the vicinity of the retention time of the styrene trimer (molecular weight 312), many peaks of oligomers derived from the styrene monomer and the (meth)acrylate ester monomer were detected.

The content of each co-reacted cyclic trimers was determined by summing the area attributed to each co-reacted cyclic trimer and converting the sum into the content by using 1-phenyl-4-(1-phenylethyl)tetralin as a standard substance.

Measurement Conditions:

Sample preparation: One gram of a resin was dissolved in 20 ml of a mixture of methyl ethyl ketone/methanol (9/1 v/v);

Measurement equipment: 6890 made by AGILENT Ltd.;

Fixed phase of column: 5% diphenyldimethylpolysiloxane 30 m, inner diameter 0.25 mm, membrane thickness 0.25 $\mu$m;

Oven temperature: 40° C. for 1 minute→temperature increase of 20° C./min→320° C.;

Charge port temperature: 200° C.;

Carrier gas: He 80 ml/min;

Detection method: FID;
Detector temperature: 200° C.

(6) Measurement of Molecular Weight

Measurement Procedure:

Gel permeation chromatography (GPC) was used to determine polystyrene equivalent molecular weight calibrated with a monodispersed polystyrene.

Measurement Conditions:

Sample preparation: a polymer was dissolved in tetrahydrofuran in a concentration of about 1,000 ppm;

Measurement equipment: Shodex 21 made by Showa Denko K. K.;

Sample column: two tubes of KF-806L;

Reference column: two tubes of KF-800RL;

Column temperature: 40° C.;

Carrier and flow rate: THF, 1 ml/min;

Detector: RI and UV (wavelength 254 nm);

Calibration curve: monodispersed polystyrene made by TOSHO CORP. was used;

Data processing: Sic-480.

(7) Measurement of MFR

MFR was measured in accordance with ISO R1133 (conditions: 200° C., 5 kgf load)

1-2) EXAMPLES OF MANUFACTURING METHOD

Example 1

A set of polymerization equipment was prepared which was composed of the first polymerization vessel, i.e., a complete mixing type of polymerization vessel (4 L) equipped with an agitator, and the second polymerization vessel, i.e., a plug flow type of polymerization vessel (2 L) equipped with an agitator, connected in series. A line mixer equipped with an agitator was inserted between the first and second polymerization vessels.

A raw material solution containing 73.6% by weight of styrene, 18.4% by weight of n-butyl acrylate, 8% by weight of ethylbenzene and 300 ppm of 1,1-bis(t-butylperoxy)cyclohexane as an organic peroxide was fed at a rate of 0.9 l/hr into the top part of the first polymerization vessel and taken out from the bottom part of the vessel.

A raw material of the same composition as described above was fed additionally at a rate of 0.1 l/hr, followed by mixing in a line mixer and passing through the second polymerization vessel from the top part downward. The inner temperatures of the first and second polymerization vessels were controlled at 105° C. and 120 to 140° C., respectively.

The thus obtained polymerization solution was continuously fed to a devolatilization extruder mounted with two-stage vents. A polymer was obtained by devolatilizing unreacted monomers and solvents. The devolatilization extruder was controlled so that the polymer temperature was maintained at 200 to 240° C. and the degree of vacuum at 20 torr.

Oligomers extracted from the styrene-based polymer obtained were measured in accordance with the above-described method. FIG. 1 shows an output chart of gas chromatography. As major peaks corresponding to trimers, 17 peaks, T01 to T17, were detected. By combining one or two stages of liquid chromatography, several peaks were further separated, resulting in the detection of 24 components in total. The structure of each component was identified by structural analysis of the major components fractionated. FIG. 1 shows a relation between peak positions on a chart of gas chromatography and component numbers. Sub-numbers a, b or c in Table 1 mean that a single peak on the chart of gas chromatography shown in FIG. 1 was separated into several peaks by combining with a liquid chromatography.

Table 1 and Table 2 show a structure and an existence ratio (%) of each peak.

An amount of total co-reacted cyclic trimers contained in the styrene-based polymer of this Example was 4,400 ppm.

Examples 2 to 6 and Comparative Examples 1 and 2

Polymerizations were conducted using the same equipment in the same manner as in Example 1. Ratios of styrene, n-butyl acrylate, ethyl acrylate, methyl acrylate and methyl methacrylate in a raw material solution were changed so as to attain polymer compositions as shown in Table 2.

Optionally, the concentrations of ethylbenzene and 1,1-bis(t-butylperoxy)cyclohexane in a raw material solutions were adjusted or a chain transfer agent (α-methylstyrene dimer) was added. Further, polymerization temperature was also controlled depending on each purpose.

Example 7

The same equipment as in Example 1 was used. A raw material solution containing 73.6% by weight of styrene, 18.4% by weight of n-butyl acrylate, 8% by weight of ethylbenzene and 300 ppm of 1,1-bis(t-butylperoxy)cyclohexane as an organic peroxide was fed at a rate of 1.0 l/hr into the top part of the first polymerization vessel and taken out from the bottom part of the vessel. Then, the raw material solution as such was passed through the second polymerization vessel from the top part downward. The inner temperature of each polymerization vessel was controlled in the same manner as in Example 1. The polymer solution obtained was treated in the same manner as in Example 1 to obtain a styrene-based polymer.

Comparative Example 3

Polymerization was conducted using the same equipment as in Example 1 by a thermal-radical method without using an initiator. The inner temperatures of the first and second polymerization vessels were controlled at 120° C. and 150 to 170° C., respectively. Other conditions were the same as in Example 7.

Comparative Example 4

A raw material solution containing 77.6% by weight of styrene, 19.4% by weight of n-butyl acrylate, 3% by weight of ethylbenzene and 300 ppm of 1,1-bis(t-butylperoxy)cyclohexane was fed at a rate of 1 l/hr into the top part of the first polymerization vessel and taken out from the bottom part of the vessel. Then, the polymerization solution was simply passed through the second polymerization vessel from the top downward. The inner temperatures of the first and second polymerization vessels were controlled at 120° C. and 150 to 170° C., respectively. The polymer solution obtained was treated in the same manner as in Example 1 to obtain a styrene-based polymer.

Comparative Example 5

Polymerization was conducted under completely the same conditions as in Example 1. The amounts of monomers in the styrene-based polymer were controlled by slightly reducing the degree of vacuum (100 to 400 torr) during devolatilization from the polymer obtained.

Comparative Example 6

A batch polymerization was conducted using a 10 L polymerization vessel equipped with an agitator. Seven litters of a raw material solution containing 78.2% by weight of styrene, 13.8% by weight of n-butyl acrylate, 8% by weight of ethylbenzene and 300 ppm of 1,1-bis(t-butylperoxy)cyclohexane as an organic peroxide was supplied and subjected to polymerization at temperatures of 90° C. for 2 hours, 130° C. for 2 hours, 150° C. for 2 hours and then 180° C. for 2 hours. The polymer solution obtained was treated in the same manner as in Example 1 to obtain a styrene-based polymer.

Comparative Example 7

To a 130 L polymerization vessel equipped with an agitator, 50 kg of pure water and 50 g of polyvinyl alcohol were supplied and mixed with stirring. Then, 35 kg of styrene, 15 kg of methyl methacrylate and 25 g of α-methylstyrene dimer were added and polymerized at 95° C. for 6 hours, followed by further polymerization at 130° C. for 6 hours. The thus obtained beads were washed with water, dewatered, dried and then extruded at 220° C. from an extruder equipped with a vent.

Comparative Example 8

A continuous polymerization was conducted using a single complete mixing type of polymerization vessel (volume 4 L) equipped with an agitator. A residence time in the whole reaction vessels and other conditions were the same as in Example 1.

More specifically, a raw material solution containing 73.6% by weight of styrene, 18.4% by weight of n-butyl acrylate, 8% by weight of ethylbenzene and 300 ppm of 1,1-bis(t-butylperoxy)cyclohexane as an organic peroxide was fed at a rate of 0.6 l/hr into the top part of said polymerization vessel and taken out from the bottom part of the vessel. The inner temperature of the polymerization vessel was controlled at 120° C. The thus obtained polymer solution was treated in the same manner as in Example 1 to obtain a styrene-based polymer.

2. EXAMPLES OF STYRENE-BASED POLYMER RESINS 2-1) Measurement and Analysis Methods Evaluation procedures and criteria for judging the characteristics of resins are shown bellow.

(1) Measurement of Vicat Softening Point

Vicat softening point was measured according to ASTM-D1525 with 1 kg load and at temperature elevation rate of 20° C./min.

(2) Evaluation of Low Temperature Processing

A 0.25-mm thick sheet was heated at a temperature of "Vicat softening point +30° C.", or at 125° as the upper limit when "Vicat softening point +30° C." is over 125° C., and then biaxially stretched double in each direction using a stretching machine. Thus, 10 sheets of stretched films with a thickness of about 60 μm were made. Low temperature processing performance of these sheets was evaluated according to the following criteria;

X 6 or more sheets of films broken in stretching;

○ only 1 to 3 sheets broken; and

⊚ no break.

(3) Evaluation of Thickness Unevenness of Molded Articles

Using the stretched film obtained in the above item (2), the average thickness was determined from the values measured at 16 points taken at the same interval on the same line. If a film has 30% or more of points where the thickness is out of the range of the average value ±5 μm, the film was ranked as a film with uneven thickness. This measurement was carried out on 10 sheets of films, and the thickness unevenness of molded article was judged according to the following criteria:

X 6 or more sheets of films with uneven thickness;

○ 0 1 to 3 sheets with uneven thickness; and

⊚ no film with uneven thickness.

A film which was broken during stretching in the preparation of 10 sheets of films, was judged as a film with uneven thickness.

(4) Measurement of Dart Impact Strength

Using a film with a thickness of about 60 μm obtained by the same method as in item (2), dart impact strength was measured with a DuPont type dart impact tester (B-50) made by Toyo Seiki Seisaku-Sho, Ltd., with 100 g load and drop weight missile with a diameter of ⅛ inch. The measurement was repeated at different heights to determine a 50% failure height.

(5) Measurement of Elongation at Break

Using a 0.25-mm thick sheet, elongation at break was measured in accordance with ASTM D882-67.

(6) Measurement of Natural Shrinkage

A stretch film obtained by the same method as in item (1) was left for standing in a thermostatic chamber at 37° C. for 21 days to calculate natural shrinkage according to the following equation:

natural shrinkage (%)=(L1−L2)/L1×100 wherein, L1 is a length before left for standing, and L2 is a length after left for standing.

(7) Evaluation of Weather Resistance

A Daipla Metal Weather Tester (KU-R5CI-A model) made by Daipla Wintes Co. Ltd. was used. A color change (ΔE) on an injection molded plate of 50×50×2 mm in dimension was measured by irradiating with a metal halide lamp (with KF-1 filter used) as a light source for up to 400 hours in total at a cycle of 30° C.×humidity 98% RH×4 hours and 55° C.×humidity 50% RH×4 hours.

(8) Evaluation of Characteristics of Reworked Resin

Each resin was extruded and palletized three times repeatedly at "Vicat softening point +100° C." (at 150° C. only in Comparative Example 2) and then molded and evaluated in the same manner as in the above-described test for low temperature processing characteristics and thickness unevenness of molded articles.

2-2) Examples of Evaluation of Characteristics of Resin

Sheets of styrene polymers obtained in Examples 1 to 7 and Comparative Examples 1 to 8 were made from a 40 mm sheet extruder. Extrusion temperature was set at the Vicat softening point of each resin +100° C. except for 170° C. in Comparative Example 2. Sheets each with a thickness of 0.25 mm were prepared to measure low temperature processing characteristics, thickness unevenness of molded articles obtained by secondary processing of said sheets, dart impact strength, elongation at break and natural shrinkage by the following methods. Weather resistance was evaluated by the following method using 50×50×2 mm injection molded plate. Results of measurement and evaluation are shown in Tables 3 and 4.

From Tables 3 and 4, it is found that the resins of Examples 1 to 7 are well balanced in low temperature processing characteristics, thickness unevenness of molded articles, dart impact strength, elongation at break, natural shrinkage, weather resistance and rework characteristics. Further, when resins having the same (meth)acrylic ester content are compared as for weather resistance, n-butyl acrylate is found to provide the most weather resistance and reduction effect on Vicat softening point.

Comparative Example 1 is an example of an extremely low content of (meth)acrylic ester monomer unit. It shows inferior results in weather resistance, reworked resin characteristics and strength characteristics to the Examples. Vicat softening point is as high as 105° C., and thus a low temperature processing characteristics is very poor.

Comparative Example 2 is an example of an extremely high content of a (meth)acrylic ester monomer unit. It shows a low Vicat softening point of less than 40° C., an very large natural shrinkage and a poor low temperature processing characteristics.

Example 7 and Comparative Example 3 provide a comparison of an initiator induced radical polymerization and a thermally induced radical polymerization. The styrene-based polymer obtained by the thermally induced radical polymerization has an inferior reworked resin characteristics as compared to that obtained by the initiator induced radical polymerization. This is because the amount of co-reacted cyclic trimer components increases. Lowered weather resistance is also seen.

Comparative Example 4 shows broadening of molecular weight distribution and increased content of co-reacted cyclic trimer components, and thus reduced reworked resin characteristics, strength characteristics and weather resistance, due to a high polymerization temperature.

Comparative Example 5 is an example of a polymer with a high residual monomer content, and thus is inferior in weather resistance, temperature processing performance and reworked resin characteristics.

Comparative Example 6 is an example of a styrene-based polymer obtained by a batch process, and is inferior in thickness unevenness of molded articles and reworked resin characteristics.

Comparative Example 7 is an example of a polymer obtained by a suspension polymerization process, and inferior in low temperature processing characteristics, reworked resin characteristics, weather resistance and strength.

Comparative Example 8 is an example of a styrene-based polymer obtained using only a complete mixing type of polymerization vessel. Polymerization conversion was very low and the amount of residual monomers in the polymer was large. The polymer is inferior in strength and thickness unevenness of molded articles using both virgin and reworked resins.

3. EXAMPLES OF STYRENE-BASED POLYMER RESIN COMPOSITIONS 3-1) Measurement and Analysis Methods The characteristics of resin compositions was measured and evaluated by the methods and criteria described below.

(1) Measurement of Vicat Softening Point

Vicat softening point was measured according to ASTM D1525 with 1 kg load and at a temperature elevation rate of 20° C./min.

(2) Finishing Performance of Heat Shrink Film

A heat shrink film (folding width of 148 mm, height of 90 mm) in a tubular form was set around a 1.5 L PET bottle (a "Kokeshi" (Japanese traditional wooden doll)-shaped container with a maximum diameter of 91 mm and a height of 310 mm, filled with water at 30° C.), then subjected to a heat shrink in a hot air chamber at an inner temperature of 135° C. for a residence time of 10 seconds to evaluate the fitting state of the heat shrink film around the bottle as follows.

The heat shrink film set around the bottle was lightly rotated with a fingertip in a tangential direction to check looseness thereof. If any one of ten samples of each composition shows a criterion as described below, the criterion is regarded as the rank of the composition.

○: no clearance between a film and the bottle, or not rotated even if there is a little clearance;

Δ: slightly rotated (within 1 mm); and

X: freely rotated (3) Tensile Strength

Tensile strength was measured in accordance with ASTM-D882 as a value for the orthogonal direction to the main stretching direction (average value of n=5).

Tensile strength indicates the mechanical strength of film. Higher tensile strength means higher mechanical strength of the film.

○: not less than 3.0 kg/mm$^2$;

Δ: from 2.5 to less than 3.0 kg/mm$^2$; and

X: less than 2.5 kg/mm$^2$ (4) Measurement of Elongation at Break

As an indication of how easily the film can be stretched, the elongation at break was measured in accordance with ASTM-D882 one day after the film-forming A value for the orthogonal direction to the main stretching direction was measured (average value of n=5).

A film with high elongation and less time-dependent change is superior, since it causes less film break on a packaging machine and shows little deterioration of quality by a solvent or heat during a printing process. Higher elongation at break is better.

○: not less than 150%;

Δ: from 120 to less than 150%; and

X: less than 120%

(5) Evaluation of Folding Strength

Folding strength was measured according to ASTM-D2176 with 2 kg load in a folded state in the orthogonal direction to the main stretching direction (an average value of n=5, rounded to the nearest whole number).

A film is folded to form a tubular shape. Therefore, it is judged whether the film is apt to be broken at the folding line. Film was folded repeatedly until it is broken. More folding times means that it is better in folding strength.

○: not less than 31 times;

Δ: from 11 to less than 30 times; and

X: less than 10 times (6) Measurement of Natural Shrinkage

Dimensional shrinkage rate L was calculated by the following equation using $L_0$, the original length of a film in the main stretching direction, and $L_1$, a length after the storage in an oven at 30° C. for 30 days.

For example, the dimensional change (shrinkage) of a film under the storing conditions in the market (atmospheric temperature, storing period) causes a trouble such that the film becomes difficult to apply to a bottle due to the shrinkage of the film to a smaller size. Therefore, less dimensional shrinkage rate is critical for a film quality.

$$L(\%)=(L_0-L_1)\times 100/L_0$$

⊚: less than 1.0%;

○: from 1.0 to less than 2.0%;

Δ: from 2.0 to less than 5.0%; and

X: not less than 5.0%

(7) Evaluation of Total Light Transmittance

Transparency is a critical property to determine the value of film product. A transparent and glossy film is superior. A film with a small HAZE value and a large GLOSS value is superior.

Total transmittance was determined using a 1 mm-thick injection molded sheet.

○: not less than 85%;

Δ: from 75 to less than 85%; and

X: less than 75%

(8) Evaluation of Gloss (%)

Gloss is a critical property to determine the value of film product. A transparent and glossy film is superior.

GLOSS (%) of a heat shrink film was measured in accordance with ASTM-D2457 (angle of 45°) (an average value of n=5).

○: not less than 125%;

Δ: from 100 to less than 125%; and

X: less than 100%

(9) Evaluation of Reworked Resin Performance

Each resin was extruded at Vicat softening point +100° C. and palletized three times repeatedly, followed by being formed into a heat shrink film. The above-described finishing performance of the heat shrink film, folding strength and flow irregularity were observed.

a. finishing performance of heat shrink film: the same evaluation method as for a virgin resin.

b. folding strength: the same evaluation method as for a virgin resin.

c. flow irregularity: flow irregularity (uneven thickness aligned in a linear shape associated with film stretching) on the surface of a biaxially stretched film was evaluated by visual assessment. A smooth film with no conspicuous irregularity is superior.

◎: conformable level (no flow irregularity observable by visual assessment);

○: conformable level (with a fine flow irregularity but no clearly observable flow irregularity);

Δ: non-conformable level (flow irregularity is clearly observed sometimes); and

X: non-conformable level (flow irregularity is clearly observed always)

(10) Total Evaluation of Resin Performance

Total evaluation as a hard type of heat shrink film was made based on the results of 10 evaluation items. Criteria are as follows:

○ (best level): ◎ or ○ in every evaluation item;

Δ (relatively good level): Δ in 2 items or less and no X; and

X (non-conformable level): Δ in 3 items or more or X in some item(s)

Total evaluation of ○ or Δ is practically conformable level and ○ shows particularly superior quality.

3-2) EXAMPLES OF RESIN COMPOSITION PERFORMANCE EVALUATION

Polymer Manufacturing Example 1 (Example of Manufacturing a Styrene-Conjugated Diene Block Copolymer)

To a 100 L reactor equipped with an agitator, 50 Kg of cyclohexane as a solvent, 0.36 Kg of butadiene monomer, 3.6 Kg of styrene monomer and 9.4 mmole of n-butyllithium were charged. The solution was subjected to polymerization for 2 hours with gradually heating. The solution was then once cooled to 30° C., to which 2.44 Kg of butadiene monomer was added to be polymerized for 1 hour with gradually heating. The solution was then cooled to 30° C. again, to which 3.6 Kg of styrene monomer was added to be polymerized for 2 hours with gradually heating.

The anion active terminals of the polymer solution thus obtained was deactivated by adding 10 times equivalent amount of methanol to the amount of lithium. The polymer was then separated by precipitation with methanol, followed by adding 0.05 g of an antioxidant per 100 g of the polymer and removing volatile components at 160° C. using a volatilization extruder equipped with a vent.

The polymer thus obtained had a B-A-B-A type of tetrablock structure with a partially gradient styrene distribution. The structures of the polymer obtained are shown in Tables 5 and 6.

Polymer Manufacturing Example 2 (Example of Manufacturing a Styrene-Conjugated Diene Block Copolymer)

To a 100 L reactor equipped with an agitator, 50 Kg of cyclohexane as a solvent was charged. Thereafter, while keeping the temperature at 50° C., 9.8 mmole of sec-butyllithium as a polymerization initiator and 3.6 Kg of styrene monomer, then a mixed conjugated diene monomer composed of 1.68 Kg of butadiene monomer and 1.12 Kg of isoprene monomer, and further 3.6 Kg of styrene monomer were sequentially fed to polymerize each block at 50° C. to 80° C. for 1 hour, for 2 hours and for 1 hour, respectively.

Polymerization and devolatilization treatment were carried out in the same manner as in Manufacturing Example 15 as for other conditions. The thus obtained polymer had a A-B-A type of tri-block structure, and the ratio of the isoprene monomer unit in the conjugated diene monomer unit was 40% by weight. Other structures of the polymer thus obtained are shown in Table 5.

Polymer Manufacturing Example 3 (Example of Manufacturing a Styrene-Conjugated Diene Block Copolymer)

To a 100 L reactor equipped with an agitator, 50 Kg of cyclohexane as a solvent, 28 mmole of sec-butyllithium as a polymerization initiator and 7.2 Kg of styrene monomer were fed. Thereafter, while keeping the temperature at 50° C., polymerization was carried out for 1 hour. Then, 2.8 Kg of butadiene monomer was charged to be polymerized for 2 hours with gradually heating. After the completion of the polymerization, 8 mmols of trichloromethylsilane were added and mixed for coupling of anion terminals.

The thus obtained polymer had a $(A-B)_3$—Si type of radial block polymer structure containing a small amount of unreacted A-B di-block structure compound. Polymerization and devolatilization treatment were carried out in the same manner as in Manufacturing Example 1 as for other conditions. The structures of the polymer thus obtained are shown in Table 5.

Next, the results of evaluation of resin composition are shown.

The compositions of polymers in Example 14 and Comparative Examples 9 and 10 are shown in Table 5 and Table 6. As for other polymer compositions, they are composed of 70 parts by weight of component (A) and 30 parts by weight of component (B). To these polymer compositions, a mixture of the following additives was added and mixed in a blender: 0.5 part by weight of a phenol acrylate type of antioxidant (2-tert-butyl-6-(3'-tert-butyl-5'-methyl-2'-hydroxybenzyl)-4-methylphenyl acrylate), 0.2 part by weight of a phosphorous type of antioxidant (tri(2,4-di-tert-butyl) phenylphosphite), 0.3 part by weight of another phosphorous type of antioxidant (tri(4-nonyl) phenylphosphite) and 0.7 part by weight of an amine type of antistatic agent (hydroxyethylalkylamine).

This mixture was melt blended in an extruder at 190° C. and molded to a homogeneous sheet through a T-die. Further, the sheet was stretched by 1.6 times in the MD direction (the sheet extrusion direction) using a roll stretching machine at 90° C., followed by stretching by 6.0 times in the TD direction (in the parallel direction to the roll) using a tenter stretching machine at 85° C. to obtain a 50-μm thick sequentially biaxially stretched film.

The characteristics of the film thus obtained and the characteristics of the resin were evaluated. Results are shown in Tables 5 and 6.

Example 8 and Comparative Examples 3 to 15

These Example and Comparative Examples show the effects of the amount of co-reacted cyclic trimers contained in the styrene-(meth)acrylate ester copolymer as component (A). The amount of the co-reacted cyclic trimers over 10,000 ppm showed remarkable lowering of reworked resin characteristics. To the contrary, the amount of co-reacted cyclic trimers below 1,000 ppm showed lowering of processing characteristics of a virgin resin, in particular, lowering of the degree of finishing of a heat shrink film.

Examples 9 to 13

In these Examples, the kinds and amounts of acrylate esters, which compose the styrene-(meth)acrylate ester copolymer as component (A), were changed variously. These Examples show that superior resin performances can be exhibited by adjusting Vicat softening point and the like of the styrene-based polymer resin composition obtained, even if various kinds of (meth)acrylate esters are used.

Example 14

In this Example, 5% by weight of a hydrogenated terpene resin, that is a petroleum hydrocarbon resin, was used as component (C). The addition of the hydrogenated terpene resin was confirmed to have an adjustment effect on the Vicat softening point of the styrene-based polymer resin composition.

Examples 15 and 16

In these Examples, the block structure of component (B) was varied. These Examples show that the styrene-based polymer resin compositions thus obtained can exhibit superior performances in applications to sheet and film.

Comparative Examples 9 and 10

These Comparative Examples show the evaluation of performance of singly used component (A) or component (B). Each component, when singly used, showed less balanced resin performances.

Comparative Examples 11 and 12

In these Comparative Examples, the contents of a (meth) acrylate ester in a styrene-(meth)acrylate ester copolymer as component (A) were out of the range of the present invention. Too low a content of the (meth)acrylate ester is not preferable because the processing characteristics of sheet and film becomes poor. Too high a content is not preferable, either, because the softening point is lowered and thus practical resin performance is lost.

Comparative Example 16

In this Comparative Example, a suspension polymerization method was employed to obtain a styrene-(meth) acrylate ester copolymer as component (A). Lowering of a reworked resin performance was confirmed because of reduction of the co-reacted trimers.

INDUSTRIAL APPLICABILITY

A styrene-based polymer resin for sheet and film in accordance with the present invention is characterized by superior rework characteristics; superior characteristics in low temperature processing, weather resistance, various strength characteristics and homogeneity in stretching processing; and less natural shrinkage of a stretched film. The sheet and film obtained can preferably be used for various packaging materials such as containers and lids or for label materials applied to a container.

TABLE 1

| Component No. | Molecular structure of trimer | | | Existence Ratio (%) |
| --- | --- | --- | --- | --- |
| | Chain Structure | Constituting linkage Unit | Molecular Structure *1) | |
| 1 | Linear | BA/St2 | Not clear | 0.7 |
| 2-a | Linear | BA/St2 | Not clear | 1.7 |
| 2-b | Linear | BA/St2 | Not clear | 4.0 |
| 2-c | Cyclic | BA2/St | Formula (13) | 11.0 |
| 3-a | Linear | St3 | Formula (8) | 7.3 |
| 3-b | Cyclic | BA2/St | Formula (13) | 4.9 |
| 4 | Cyclic | BA2/St | Formula (13) | 7.4 |
| 5-a | Cyclic | BA2/St | Formula (13) | 5.0 |
| 5-b | Cyclic | BA/St2 | Formula (12) | 7.1 |
| 6 | Cyclic | BA/St2 | Formula (12) | 2.4 |
| 7-a | Cyclic | BA/St2 | Formula (10) | 4.2 |
| 7-b | Cyclic | BA/St2 | Formula (10) | 7.3 |
| 8 | Cyclic | BA/St2 | Not clear | 3.5 |
| 9 | Cyclic | BA/St2 | Formula (12) | 5.1 |
| 10-a | Cyclic | BA/St2 | Formula (10) | 4.7 |
| 10-b | Cyclic | BA/St2 | Not clear | 0.9 |
| 11 | Cyclic | St3 | Formula (9) | 2.3 |
| 12-a | Cyclic | BA2/St | Formula (14) | 3.8 |
| 12-b | Cyclic | St3 | Formula (9) | 3.0 |
| 13 | Cyclic | St3 | Formula (9) | 0.9 |
| 14 | Cyclic | St3 | Formula (9) | 1.3 |
| 15 | Cyclic | BA2/St | Formula (14) | 3.8 |
| 16 | Cyclic | BA/St2 | Formula (11) | 5.6 |
| 17 | Cyclic | BA/St2 | Formula (11) | 2.1 |

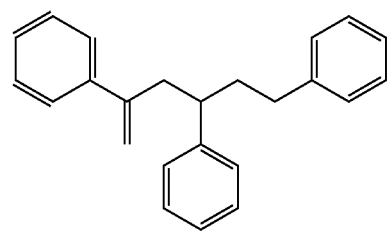

2,4,6-Triphenyl-1-hexene (8)

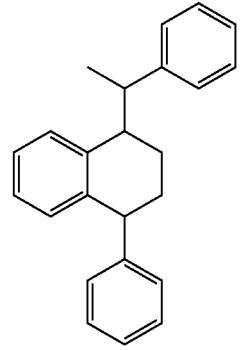

1-Phenyl-4-(1-phenylethyl)tetralin (9)

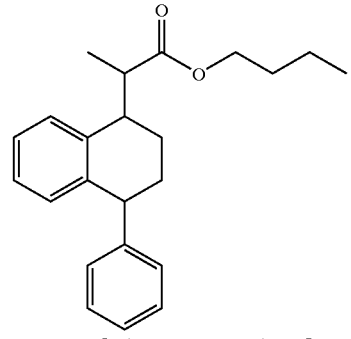

1-Phenyl-4-[1-(n-butoxycarbonyl)ethyl]tetralin (10)

TABLE 1-continued

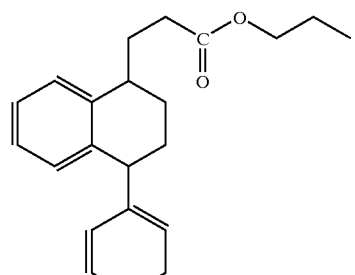

1-Phenyl-4-[2-(n-butoxycarbonyl)ethyl]tetralin (11)

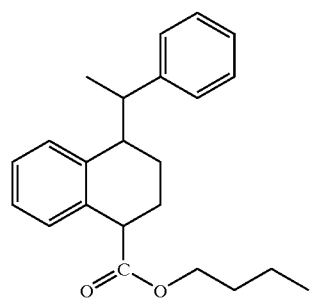

1-Butoxycarbonyl-4-(1-phenylethyl)tetralin (12)

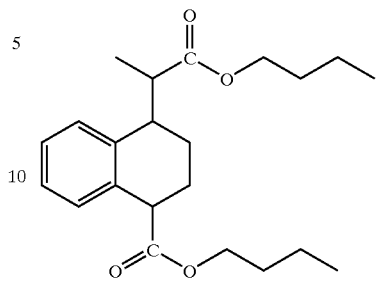

1-n-Butoxycarbonyl-4-[1-(n-butoxycarbonyl)ethyl]tetralin (13)

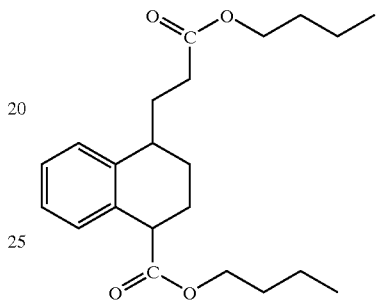

1-n-Butoxycarbonyl-4-[2-(n-butoxycarbonyl)ethyl]tetralin (14)

TABLE 2

| Constituting linkage Unit[1] | Component No. | Molecular Structure of Trimer Chain Structure | Molecular Structure | Ratio of Component to Total Trimers | Existence Ratio (%) Existence Amount of Component | Ratio relative to Cyclic Trimer Existence Amount of Group |
|---|---|---|---|---|---|---|
| St3 | 3a | Linear trimer | Formula (8) | 7.3 | | |
| | 11, 12b, 13, 14 | Cyclic trimer | Formula (9) | 7.5 | 8.7 | 8.7 |
| BA/St2 | 1, 2a, 2b | Linear trimer | Not clarified | 6.4 | | |
| | 7a, 7b | Cyclic trimer | Formula (10) | 16.2 | 18.8 | 49.7 |
| | 16, 17 | Cyclic trimer | Formula (11) | 7.7 | 8.9 | |
| | 5b, 6, 9 | Cyclic trimer | Formula (12) | 14.6 | 16.9 | |
| | 8, 10b | Cyclic trimer | Not clarified | 4.4 | 5.1 | |
| BA2/St | 2c, 3b, 4, 5a | Cyclic trimer | Formula (13) | 28.3 | 32.8 | 41.6 |
| | 12a, 15 | Cyclic trimer | Formula (14) | 7.6 | 8.8 | |
| BA3 | Nil | — | — | Nil | Nil | Nil |

[1]Note: Constituting Bonding Unit
St3 = Trimer composed of 3 units of styrene monomer linkage.
BA/St2 = Trimer composed of 2 units of styrene monomer linkage and 1 unit of butyl acrylate linkage.
BA2/St = Trimer composed of 1 unit of styrene monomer linkage and 2 units of butyl acrylate linkage.
BA3 = Trimer composed of 3 units of butyl acrylate linkage, but substantially not present.

TABLE 3-1

| Analysis/Evaluation Item | | Example 1 | Example 2 | Example 3 | Example 4 |
|---|---|---|---|---|---|
| Polymerization conversion rate (wt %) | | 70 or more | 63 | 70 or more | 70 or more |
| Lower limit of (meth)acrylate in polymerization solution (wt %)*1) | | 5 or more | 5 or more | 5 or more | 5 or more |
| Constituting linkage unit of polymer (wt %)*2) | Styrene linkage unit | 79.6 | 84.7 | 71.5 | 69.8 |
| | BA linkage unit | 20.4 | 15.3 | 28.5 | 20.2 |
| | EA linkage unit | 0 | 0 | 0 | 0 |
| | MA linkage unit | 0 | 0 | 0 | 0 |

TABLE 3-1-continued

| Analysis/Evaluation Item | | Example 1 | Example 2 | Example 3 | Example 4 |
|---|---|---|---|---|---|
| | MMA linkage unit | 0 | 0 | 0 | 10 |
| Low molecular weight component in polymer (ppm)*3) | Styrene monomer | 210 | 180 | 170 | 160 |
| | (Meth)acrylate ester monomer | 160 | 120 | 100 | 90 |
| | Co-reacted cyclic trimer | 4,400 | 2,400 | 5,000 | 5,300 |
| Molecular weight*4) | Mw (×10$^4$) | 34.2 | 32.8 | 33.6 | 33.5 |
| | Mw/Mn | 2.7 | 2.6 | 2.6 | 2.7 |
| MFR (g/10 min.) | | 5.2 | 6.3 | 5.5 | 5.6 |
| Vicat softening point (° C.) | | 74 | 82 | 57 | 72 |
| Performances of virgin resin | Low temperature processability | ◉ | ◉ | ◉ | ◉ |
| | Uneven thickness of molded article | ◉ | ◉ | ◉ | ◉ |
| | Dart impact strength (g-cm) | 1,400 | 1,300 | 1,500 | 1,450 |
| | Tensile elongation at break (%) | 4 | 4 | 6 | 5 |
| | Natural shrinkage (%) | 0.4 | 0.3 | 0.6 | 0.5 |
| | Weather resistance (%) | 8.2 | 7.4 | 5.4 | 5.6 |
| Performances of reworked resin | Low temperature processability | ○ | ◉ | ○ | ◉ |
| | Uneven thickness of molded article | ◉ | ◉ | ○ | ◉ |

Note:
*1)The lowest content (wt %) of (meth)acrylate ester at each portion of polymerization vessels.
*2)Each abbreviation means as follows: BA: n-Butyl acrylate, EA: Ethyl acrylate, MA: Methyl acylate, MMA: Methyl methacrylate.
*3)Co-reacted cyclic trimer means a trimer with a cyclic structure containing at least one unit each of styrene linkage unit and (meth)acrylate ester linkage unit.
*4)Mw = Weight average molecular weight, Mn = Number average molecular weight.

TABLE 3-2

| Analysis/Evaluation Item | | Example 5 | Example 6 | Example 7 |
|---|---|---|---|---|
| Polymerization conversion rate (wt %) | | 70 or more | 70 or more | 70 or more |
| Lower limit of (meth)acrylate in polymerization solution (wt %)*1) | | 5 or more | 5 or more | 2.5 |
| Constituting linkage unit of polymer (wt %)*2) | Styrene linkage unit | 75.7 | 74.6 | 79.6 |
| | BA linkage unit | 0 | 0 | 20.4 |
| | EA linkage unit | 24 | 0 | 0 |
| | MA linkage unit | 0 | 25 | 0 |
| | MMA linkage unit | 0 | 0 | 0 |
| Low molecular weight component in polymer (ppm)*3) | Styrene monomer | 90 | 180 | 90 |
| | (Meth)acrylate ester monomer | 20 | 30 | 40 |
| | Co-reacted cyclic trimer | 4,900 | 5,100 | 3,600 |
| Molecular weight*4) | Mw (×10$^4$) | 34.1 | 35.2 | 36.2 |
| | Mw/Mn | 2.7 | 2.6 | 2.4 |
| MFR (g/10 min.) | | 5.2 | 4 | 3.9 |
| Vicat softening point (° C.) | | 73 | 88 | 83 |
| Performances of virgin resin | Low temperature processability | ◉ | ◉ | ○ |
| | Uneven thickness of molded article | ◉ | ◉ | ○ |
| | Dart impact strength (g-cm) | 1,400 | 1,300 | 1,350 |
| | Tensile elongation at break (%) | 5 | 3 | 4 |
| | Natural shrinkage (%) | 0.4 | 0.2 | 0.3 |
| | Weather resistnace (%) | 6 | 5.8 | 8.4 |
| Performances of reworked resin | Low temperature processability | ◉ | ◉ | ○ |
| | Uneven thickness of molded article | ◉ | ◉ | ○ |

Note:
*1)The lowest content (wt %) of (meth) acrylate ester at each portion of polymerization vessels.
*2)Each abbreviation means as follows: BA: n-Butyl acrylate, EA: Ethyl acrylate, MA: Methyl acylate, MMA: Methyl methacrylate.
*3)Co-reacted cyclic trimer means a trimer with a cyclic structure containing at least one unit each of styrenic linkage unit and (meth) acrylate ester linkage unit.
*4)Mw = Weight average molecular weight, Mn = Number average molecular weight.

TABLE 4-1

| Analysis/Evaluation Item | | Comparative Example 1 | Comparative Example 2 | Comparative Example 3 | Comparative Example 4 |
|---|---|---|---|---|---|
| Lower limit of (meth)acrylate in polymerization solution (wt %)*1) | | 0.2 | 5 or more | 5 or more | 0.9 |
| Polymerization conversion rate (wt %) | | 70 or more | 70 or more | 70 or more | 70 or more |
| Constituting linkage unit of polymer (wt %)*2) | Styrene linkage unit | 99.0 | 55.5 | 79.6 | 79.7 |
| | BA linkage unit | 1.0 | 45.5 | 20.4 | 20.3 |
| | EA linkage unit | 0 | 0 | 0 | 0 |
| | MA linkage unit | 0 | 0 | 0 | 0 |
| | MMA linkage unit | 0 | 0 | 0 | 10 |
| Low molecular weight component in polymer (ppm)*3) | Styrene monomer | 240 | 140 | 260 | 270 |
| | (Meth)acrylate ester monomer | 0 | 460 | 380 | 320 |
| | Co-reacted cyclic trimer | 280 | 6,700 | 13,300 | 10,600 |
| Molecular weight*4) | Mw (×10$^4$) | 37.3 | 31.8 | 34.5 | 33.8 |
| | Mw/Mn | 2.6 | 2.7 | 3.1 | 3 |
| MFR (g/10 min.) | | 3.3 | 7.5 | 5 | 5.2 |
| Vicat softening point (° C.) | | 102 | less than 40 | 73 | 72 |
| Performances of virgin resin | Low temperature processability | X | X | ○ | ○ |
| | Uneven thickness of molded article | X | X | ○ | ○ |
| | Dart impact strength (g-cm) | 400 | — *5) | 1,200 | 1,100 |
| | Tensile elongation at break (%) | 1 | — *5) | 5 | 5 |
| | Natural shrinkage (%) | 0 | 30 | 0.8 | 0.7 |
| | Weather resistnace (%) | 15.8 | — *5) | 10.2 | 10.6 |
| Performances of reworked resin | Low temperature processability | X | — *5) | X | X |
| | Uneven thickness of molded article | X | — *5) | X | X |

Note:
*1)The lowest content (wt %) of (meth)acrylate ester at each portion of polymerization vessels.
*2)Each abbreviation means as follows: BA: n-Butyl acrylate, EA: Ethyl acrylate, MA: Methyl acylate, MMA: Methyl methacrylate.
*3)Co-reacted cyclic trimer means a trimer with a cyclic structure containing at least one unit each of styrenic linkage unit and (meth)acrylate ester linkage unit.
*4)Mw = Weight average molecular weight, Mn = Number average molecular weight.
*5) not measured (because of difficulty in sheet- or film-forming).

TABLE 4-2

| Analysis/Evaluation Item | | Comparative Example 5 | Comparative Example 6 | Comparative Example 7 | Comparative Example 8 |
|---|---|---|---|---|---|
| Lower limit of (meth)acrylate in polymerization solution (wt %)*1) | | 5 or more | 0.7 | 2.4 | 5 or more |
| Polymerization conversion rate (wt %) | | 70 or more | 70 or more | 70 or more | 52 |
| Constituting linkage unit of polymer (wt %)*2) | Styrene linkage unit | 80.0 | 84.7 | 70.8 | 79.7 |
| | BA linkage unit | 20.0 | 15.3 | 0 | 20.3 |
| | EA linkage unit | 0 | 0 | 0 | 0 |
| | MA linkage unit | 0 | 0 | 0 | 0 |
| | MMA linkage unit | 0 | 0 | 29.2 | 0 |
| Low molecular weight component in polymer (ppm)*3) | Styrene monomer | 1,200 | 140 | 350 | 460 |
| | (Meth)acrylate ester monomer | 540 | 5 | 160 | 1,200 |
| | Co-reacted cyclic trimer | 4,100 | 850 | 440 | 3,800 |
| Molecular weight*4) | Mw (×10$^4$) | 33.1 | 33.4 | 30.9 | 29.8 |
| | Mw/Mn | 2.6 | 2.7 | 2.6 | 2.4 |
| MFR (g/10 min.) | | 6.1 | 5.9 | 2.9 | 8.5 |
| Vicat softening point (° C.) | | 74 | 83 | 106 | 72 |
| Performances of virgin resin | Low temperature processability | X | ○ | X | ○ |
| | Uneven thickness of molded article | X | X | X | X |
| | Dart impact strength (g-cm) | 1,100 | 1,200 | 600 | 900 |
| | Tensile elongation at break (%) | 5 | 4 | 1 | 4 |
| | Natural shrinkage (%) | 1.2 | 0.3 | 0 | 1 |
| | Weather resistance (%) | 12.8 | 8.4 | 10.6 | 8.8 |
| Performances of reworked resin | Low temperature processability | X | X | X | ○ |
| | Uneven thickness of molded article | X | X | X | X |

Note:
*1)The lowest content (wt %) of (meth)acrylate ester at each portion of polymerization vessels.
*2)Each abbreviation means as follows: BA: n-Butyl acrylate, EA: Ethyl acrylate, MA: Methyl acylate, MMA: Methyl methacrylate.
*3)Co-reacted cyclic trimer means a trimer with a cyclic structure containing at least one unit of styrenic linkage unit and (meth)acrylate ester linkage unit.
*4)Mw = Weight average molecular weight, Mn = Number average molecular weight.
*5)not measured (because of difficulty in sheet- or film-forming).

TABLE 5-1

|  |  | Experimental No. | Example 8 | Example 9 | Example 10 | Example 11 | Example 12 |
|---|---|---|---|---|---|---|---|
| Component (A) | | Example No. for manufacturing polymer | Example 1 | Example 2 | Example 3 | Example 4 | Example 5 |
| | | Amount used (wt %) | 70 | 70 | 70 | 70 | 70 |
| | | St content (wt %) | 79.6 | 84.7 | 71.5 | 69.8 | 75.7 |
| | | BA content (wt %) | 20.4 | 15.3 | 28.5 | 20.2 | 0 |
| | | EA content (wt %) | 0 | 0 | 0 | 0 | 24.3 |
| | | MA content (wt %) | 0 | 0 | 0 | 0 | 0 |
| | | MMA content (wt %) | 0 | 0 | 0 | 10 | 0 |
| | | Content of styrene (ppm) | 210 | 180 | 170 | 160 | 90 |
| | | Content of (meth)acrylate ester (ppm) | 160 | 120 | 100 | 90 | 20 |
| | | Content of co-reacted cyclic trimer (ppm) | 4,400 | 2,400 | 5,000 | 5,300 | 4,900 |
| | | Weight average molecular weight (×10$^4$) | 34.2 | 32.8 | 33.6 | 33.5 | 34.1 |
| | | Molecular weight distribution (Mw/Mn) | 2.7 | 2.6 | 2.6 | 2.7 | 2.7 |
| | | MFR (g/10 min.) | 5.2 | 6.3 | 5.5 | 5.6 | 5.2 |
| Component (B) | | Manufacturing method of polymer | Manufacturing Example 1 | Manufacturing Example 1 | Manufacturing Example 1 | Manufacturing Example 1 | Manufacturing Example 1 |
| | | Amount used (wt %) | 30 | 30 | 30 | 30 | 30 |
| | | Structure of polymer chain | Tetra-block | Tetra-block | Tetra-block | Tetra-block | Tetra-block |
| | | Branched structure of polymer chain | Linear | Linear | Linear | Linear | Linear |
| | | Styrene content (wt %) | 72 | 72 | 72 | 72 | 72 |
| | | Conjugated diene content (wt %) | 28 | 28 | 28 | 28 | 28 |
| | | Weight average molecular weight | 10.7 | 10.7 | 10.7 | 10.7 | 10.7 |
| Component (C) | | Amount used (wt %) | 0 | 0 | 0 | 0 | 0 |

TABLE 5-2

|  |  | Experimental No. | Example 13 | Example 14 | Example 15 | Example 16 |
|---|---|---|---|---|---|---|
| Component (A) | | Example No. for manufacturing polymer | Example 6 | Example 7 | Example 8 | Example 9 |
| | | Amount used (wt %) | 70 | 65 | 70 | 70 |
| | | St content (wt %) | 74.6 | 79.5 | 79.6 | 79.6 |
| | | BA content (wt %) | 0 | 20.5 | 20.4 | 20.4 |
| | | EA content (wt %) | 0 | 0 | 0 | 0 |
| | | MA content (wt %) | 25.4 | 0 | 0 | 0 |
| | | MMA content (wt %) | 0 | 0 | 0 | 0 |
| | | Content of styrene (ppm) | 180 | 90 | 210 | 210 |
| | | Content of (meth)acrylate ester | 30 | 40 | 160 | 160 |
| | | Content of co-reacted cyclic trimer | 5,100 | 3,600 | 4,400 | 4,400 |
| | | Weight average molecular weight (×10$^4$) | 35.2 | 36.2 | 34.2 | 34.2 |
| | | Molecular weight distribution (Mw/Mn) | 2.6 | 2.4 | 2.7 | 2.7 |
| | | MFR (g/10 min.) | 4 | 3.9 | 5.2 | 5.2 |
| Component (B) | | Manufacturing method of polymer | Manufacturing Example 1 | Manufacturing Example 1 | Manufacturing Example 2 | Manufacturing Example 3 |
| | | Amount used (wt %) | 30 | 30 | 30 | 30 |
| | | Structure of polymer chain | Tetra-block | Tetra-block | Tri-block | Radial |
| | | Branched structure of polymer chain | Linear | Linear | Linear | Radial |
| | | Styrene content (wt %) | 72 | 72 | 72 | 72 |
| | | Conjugated diene content (wt %) | 28 | 28 | 28 | 28 |
| | | Weight average molecular weight | 10.7 | 10.7 | 11.2 | 12.1 |
| Component (C) | | Amount used (wt %) | 0 | 5 | 0 | 0 |

TABLE 5-3

|  | Experimental No. | Example 8 | Example 9 | Example 10 | Example 11 | Example 12 |
|---|---|---|---|---|---|---|
| Vicat softening point of resin (° C.) | | 74 | 80 | 62 | 73 | 74 |
| Performances of virgin resin | Heat shrink film | ○ | ○ | ○ | ○ | ○ |
| | Tensile strength at break (kg/mm$^2$) | ○ 3.8 | ○ 3.7 | ○ 4.2 | ○ 4.0 | ○ 4.0 |
| | Tensile elongation at break (%) | ○ 200 | ○ 170 | ○ 240 | ○ 200 | ○ 190 |
| | Folding strength | ○ | ○ | ○ | ○ | ○ |
| | Natural shrinkage | ⊙ | ⊙ | ⊙ | ⊙ | ⊙ |
| | Total light transmittance | ○ | ○ | ○ | ○ | ○ |
| | Gloss | ○ | ○ | ○ | ○ | ○ |
| Performances of reworked resin | Heat shrink film | ○ | ○ | ○ | ○ | ○ |
| | Folding strength | ○ | ○ | ○ | ○ | ○ |
| | Irregularity of flow | ⊙ | ⊙ | ⊙ | ⊙ | ⊙ |
| Total evaluation of resin performance | | ○ | ○ | ○ | ○ | ○ |

TABLE 5-4

| Experimental No. | | Example 13 | Example 14 | Example 15 | Example 16 |
|---|---|---|---|---|---|
| Vicat softening point of resin (° C.) | | 84 | 81 | 74 | 74 |
| Performances of virgin resin | Heat shrink film | ◯ | ◯ | ◯ | ◯ |
| | Tensile strength at break (kg/mm$^2$) | ◯ 3.5 | ◯ 3.8 | ◯ 3.7 | ◯ 3.6 |
| | Tensile elongation at break (%) | ◯ 160 | ◯ 170 | ◯ 190 | ◯ 180 |
| | Folding strength | ◯ | ◯ | ◯ | ◯ |
| | Natural shrinkage | ◉ | ◉ | ◉ | ◉ |
| | Total light transmittance | ◯ | ◯ | ◯ | ◯ |
| | Gloss | ◯ | ◯ | ◯ | ◯ |
| Performances of reworked resin | Heat shrink film | ◯ | ◯ | ◯ | ◯ |
| | Folding strength | ◯ | ◯ | ◯ | ◯ |
| | Irregularity of flow | ◉ | ◯ | ◉ | ◉ |
| Total evaluation of resin performance | | ◯ | ◯ | ◯ | ◯ |

TABLE 6-1

| Experimental No. | | Comparative Example 9 | Comparative Example 10 | Comparative Example 11 | Comparative Example 12 |
|---|---|---|---|---|---|
| Component (A) | Example No. for manufacturing polymer | Example 1 | | Comparative Example 1 | Comparative Example 2 |
| | Amount used (wt %) | 100 | 0 | 70 | 70 |
| | St content (wt %) | 79.6 | — | 99 | 54.5 |
| | BA content (wt %) | 20.4 | — | 1 | 45.5 |
| | EA content (wt %) | 0 | — | 0 | 0 |
| | MA content (wt %) | 0 | — | 0 | 0 |
| | MMA content (wt %) | 0 | — | 0 | 0 |
| | Content of styrene (ppm) | 210 | — | 240 | 140 |
| | Content of (meth)acrylate ester (ppm) | 160 | — | 0 | 460 |
| | Content of co-reacted cyclic trimer (ppm) | 4,400 | — | 280 | 6,700 |
| | Weight average molecular weight (×10$^4$) | 34.2 | — | 37.3 | 31.8 |
| | Molecular weight distribution (Mw/Mn) | 2.7 | — | 2.6 | 2.7 |
| | MFR (g/10 min.) | 5.2 | — | 3.3 | 7.5 |
| Component (B) | Manufacturing method of polymer | — | Manufacturing Example 1 | Manufacturing Example 1 | Manufacturing Example 1 |
| | Amount used (wt %) | 0 | 100 | 30 | 30 |
| | Structure of polymer chain | — | Tetra-block | Tetra-block | Tetra-block |
| | Branched structure of polymer chain | — | Linear | Linear | Linear |
| | Styrene content (wt %) | — | 72 | 72 | 72 |
| | Conjugated diene content (wt %) | — | 28 | 28 | 28 |
| | Weight average molecular weight | — | 10.7 | 10.7 | 10.7 |
| Component (C) | Amount used (wt %) | 0 | 0 | 0 | 0 |

TABLE 6-2

| Experimental No. | | Comparative Example 13 | Comparative Example 14 | Comparative Example 15 | Comparative Example 16 |
|---|---|---|---|---|---|
| Component (A) | Example No, for manufacturing polymer | Comparative Example 3 | Comparative Example 4 | Comparative Example 6 | Comparative Example 7 |
| | Amount used (wt %) | 70 | 70 | 70 | 70 |
| | St content (wt %) | 79.6 | 79.7 | 84.7 | 70.8 |
| | BA content (wt %) | 20.4 | 20.3 | 15.3 | 0 |
| | EA content (wt %) | 0 | 0 | 0 | 0 |
| | MA content (wt %) | 0 | 0 | 0 | 0 |
| | MMA content (wt %) | 0 | 0 | 0 | 29.2 |
| | Content of styrene (ppm) | 260 | 270 | 140 | 350 |
| | Content of (meth)acrylate ester (ppm) | 380 | 320 | 5 | 160 |
| | Content of co-reacted cyclic trimer (ppm) | 13,300 | 10,600 | 850 | 440 |
| | Weight average molecular weight (×10$^4$) | 34.5 | 33.8 | 33.4 | 30.9 |
| | Molecular weight distribution (Mw/Mn) | 3.1 | 3 | 2.7 | 2.6 |
| | MFR (g/10 min.) | 5 | 5.2 | 5.9 | 2.9 |
| Component (B) | Manufacturing method of polymer | Manufacturing Example 1 | Manufacturing Example 1 | Manufacturing Example 1 | Manufacturing Example 1 |
| | Amount used (wt %) | 30 | 30 | 30 | 30 |
| | Structure of polymer chain | Tetra-block | Tetra-block | Tetra-block | Tetra-block |
| | Branched structure of polymer chain | Linear | Linear | Linear | Linear |
| | Styrene content (wt %) | 72 | 72 | 72 | 72 |

TABLE 6-2-continued

| Experimental No. | Comparative Example 13 | Comparative Example 14 | Comparative Example 15 | Comparative Example 16 |
|---|---|---|---|---|
| Conjugated diene content (wt %) | 28 | 28 | 28 | 28 |
| Weight average molecular weight | 10.7 | 10.7 | 10.7 | 10.7 |
| Component (C) Amount used (wt %) | 0 | 0 | 0 | 0 |

TABLE 6-3

| | Experimental No. | Comparative Example 9 | Comparative Example 10 | Comparative Example 11 | Comparative Example 12 |
|---|---|---|---|---|---|
| Performances of virgin resin | Vicat softening point (° C.) | 74 | 75 | 97 | Lower than 50° C. |
| | Heat shrink film | X | ○ | X | — |
| | Tensile strength at break (kg/mm$^2$) | ○ 4.0 | △ 2.7 | X 2.4 | — |
| | Tensile elongation at break (%) | X 5 | ○ 320 | X 40 | — |
| | Folding strength | X | ○ | △ | — |
| | Natural shrinkage | ⊙ | X | ⊙ | — |
| | Total light transmittance | ○ | ○ | ○ | — |
| | Gloss | ○ | △ | ○ | — |
| Performances of reworked resin | Heat shrink film | X | X | X | — |
| | Folding strength | X | ○ | △ | — |
| | Irregularity of flow | ⊙ | X | X | — |
| Total evaluation of resin performance | | X | X | X | X |

TABLE 6-4

| | Experimental No. | Comparative Example 13 | Comparative Example 14 | Comparative Example 15 | Comparative Example 16 |
|---|---|---|---|---|---|
| Performances of virgin resin | Vicat softening point (° C.) | 74 | 73 | 81 | 97 |
| | Heat shrink film | ○ | ○ | X | X |
| | Tensile strength at break (kg/mm$^2$) | ○ 3.6 | ○ 3.5 | ○ 3.7 | ○ 3.7 |
| | Tensile elongation at break (%) | ○ 160 | ○ 180 | △ 140 | X 60 |
| | Folding strength | ○ | ○ | ○ | ○ |
| | Natural shrinkage | ○ | ○ | ⊙ | ⊙ |
| | Total light transmittance | ○ | ○ | ○ | △ |
| | Gloss | ○ | ○ | ○ | ○ |
| Performances of reworked resin | Heat shrink film | X | X | X | X |
| | Folding strength | △ | △ | ○ | ○ |
| | Irregularity of flow | X | X | X | X |
| Total evaluation of resin performance | | X | X | X | X |

What is claimed is:

1. A method for manufacturing a styrene-based polymer comprising the steps of continuously feeding raw materials into one end of two or more polymerization vessels connected in series; polymerizing a styrenic monomer in the coexistence of a (meth)acrylate ester monomer by using an organic radical generating agent as an initiator by a mass or solution polymerization method of continuous process; and continuously taking out a product from another end of said polymerization vessels, wherein polymerization conditions are controlled in ranges specified by the following items (a) and (b):

(a) a composition of monomers to be fed is 60 to 97% by weight of a styrenic monomer(s) and 3 to 40% by weight of a (meth)acrylate ester monomer(s); and (b) a concentration of the (meth)acrylate ester monomer(s) at any part of said polymerization vessels exceeds 1% by weight based on total monomers at any time during the polymerization.

2. The method in accordance with claim 1, wherein said polymerization vessels are composed so that a mixing state at least in the final polymerization vessel is a plug flow.

3. The method in accordance with claim 1 or 2, wherein said styrene-based polymer obtained is controlled in a range shown by the following items (c) and (d):

(c) a weight average molecular weight of said styrene-based polymer is in a range of 150,000 to 550,000; and (d) said styrene-based polymer contains, in a range of 1,000 to 10,000 ppm, a cyclic structured trimer containing at least one unit each of styrene monomer unit and (meth)acrylate ester monomer unit in a molecule.

4. The method in accordance with claim 3, wherein said cyclic structured trimer containing at least one unit each of styrene monomer unit and (meth)acrylate ester monomer unit in a molecule is selected from the group consisting of 1-phenyl-4-(1-(alkoxycarbonyl)ethyl)tetralin, 1-phenyl-4-(2-(alkoxycarbonyl)ethyl)tetralin, 1-phenyl-4-(1-(alkoxycarbonyl)ethyl)tetralin, 1-(1-phenylethyl)-4-(alkoxycarbonyl)tetralin, 1-alkoxycarbonyl-4-(1-

(alkoxycarbonyl)ethyl)tetralin and 1-alkoxycarbonyl-4-(2-(alkoxycarbonyl)ethyl)tetralin.

5. The method in accordance with any one of claims 1 to 2, wherein at least 20% by weight of said (meth)acrylate ester monomer unit composing the styrene-based polymer is an acrylate ester monomer unit.

6. The method in accordance with any one of claims 1 to 2, wherein at least 20% by weight of said (meth)acrylate ester monomer unit composing the styrene-based polymer is a n-butyl acrylate monomer unit.

7. The method in accordance with claim 1 or 2, wherein said (meth)acrylate ester monomer unit composing the styrene-based polymer is a n-butyl acrylate monomer unit, and said cyclic structured trimer containing at least one unit each of styrene monomer unit and (meth)acrylate ester monomer unit in a molecule, is selected from the group consisting of 1-phenyl-4-(1-(n-butoxycarbonyl)ethyl)tetralin, 1-phenyl-4-(2-(n-butoxycarbonyl)ethyl)tetralin, 1-phenyl-4-(1-(n-butoxycarbonylethyl)tetralin, 1-(1-phenylethyl)-4-(n-butoxycarbonyl)tetralin, 1-n-butoxycarbonyl-4-(1-(n-butoxycarbonyl)ethyl)tetralin and 1-n-butoxycarbonyl-4-(2-(n-butoxycarbonyl)ethyl)tetralin, and is contained in a range of 1,000 to 10,000 ppm.

8. The method in accordance with any one of claims 1 to 2, wherein polymerization of at least 50% by weight of a polymer obtained is performed at a temperature range of 70 to 150° C.

9. A styrene-based polymer resin containing, as a main component, a styrene-based polymer obtained by the steps of continuously feeding raw materials into one end of two or more polymerization vessels connected in series; polymerizing a styrenic monomer in the coexistence of a (meth)acrylate ester monomer with an organic radical generating agent as an initiator by a mass or solution polymerization method of continuous process; and continuously taking out a product from another end of said polymerization vessels, wherein said styrene-based polymer has features shown by the following items (a') to (d'):

(a') monomer units composing said styrene-based polymer are in ranges of 60 to 97% by weight of a styrenic monomer unit(s) and 3 to 40% by weight of a (meth)acrylate ester monomer unit(s);

(b') weight average molecular weight of said styrene-based polymer is 150,000 to 550,000;

(c') said styrene-based polymer contains, in a range of 1,000 to 10,000 ppm, a cyclic structured trimer containing at least one unit each of styrenic monomer unit and (meth)acrylate ester monomer unit in a molecule; and (d') Vicat softening point of said styrene-based polymer is in a range of 50 to 99° C.

10. The styrene-based polymer resin in accordance with claim 9, wherein said cyclic structured trimer containing at least one unit each of styrene monomer unit and (meth)acrylate ester monomer unit in a molecule is selected from the group consisting of 1-phenyl-4-(1-(alkoxycarbonyl)ethyl)tetralin, 1-phenyl-4-(2-(alkoxycarbonyl)ethyl)tetralin, 1-phenyl-4-(1-alkoxylcarbonyl)ethyl)tetralin, 1-(1-phenylethyl)-4-(alkoxycarbonyl)tetralin, 1-alkoxycarbonyl-4-(1-(alkoxycarbonyl)ethyl)tetralin and 1-alkoxycarbonyl-4-(2-(alkoxycarbonyl)ethyl)tetralin, and is contained in a range of 1,000 to 10,000 ppm.

11. The styrene-based polymer resin in accordance with claim 9 or 10, wherein at least 20% by weight of said (meth)acrylate ester monomer unit composing said styrene-based polymer is an acrylate ester monomer unit.

12. The styrene-based polymer resin in accordance with claim 9 or 10, wherein at least 20% by weight of said (meth)acrylate ester monomer unit composing said styrene-based polymer is a n-butyl acrylate monomer unit.

13. The styrene-based polymer resin in accordance with claim 9, wherein said (meth)acrylate ester monomer unit composing said styrene-based polymer is an n-butyl acrylate monomer unit; and said cyclic structured trimer containing at least one unit each of styrene monomer unit and (meth)acrylate ester monomer unit in a molecule is selected from the group consisting of 1-phenyl-4-(1-(n-butoxycarbonyl)ethyl)tetralin, 1-phenyl-4-(2-(n-butoxycarbonyl)ethyl)tetralin, 1-phenyl-4-(1-n-butoxycarbonyl)ethyl)tetralin, 1-(1-phenylethyl)-4-(n-butoxycarbonyl)tetralin, 1-n-butoxycarbonyl-4-(1-(n-butoxycarbonyl)ethyl)tetralin and 1-n-butoxycarbonyl-4-(2-(n-butoxycarbonyl)ethyl)tetralin, and is contained in a range of 1,000 to 10,000 ppm.

14. A styrene-based polymer resin composition comprising:

(A) 5 to 95% by weight of a styrene-(meth)acrylate ester copolymer resin;

(B) 95 to 5% by weight of a styrene-conjugated diene block copolymer; and (C) 0 to 30% by weight of a polymer compatible to said styrene-based polymer or said styrene-based polymer resin of the above (A) or (B);

wherein, said styrene-(meth)acrylate ester copolymer resin of said component (A) is the styrene-based polymer resin according to claim 9 or 10; said styrene-conjugated diene block copolymer of said component (B) has characteristics of the following items (e') to (g'); and further said styrene-based polymer resin composition has characteristics of the following items (h') and (i'):

(e') said styrene-conjugated diene block copolymer is composed of at least two styrene-based polymer blocks and at least one conjugated diene polymer block;

(f') a content of a styrenic monomer unit composing said styrene-conjugated diene block copolymer is 40 to 95% by weight;

(g') a content of a conjugated diene monomer unit composing said styrene-conjugated diene block copolymer is 60 to 5% by weight;

(h') a Vicat softening point of said styrene-based polymer resin composition is in a range of 50 to 99° C.; and (i') a total transmittance of a 1 mm-thick plate of said styrene-based polymer resin composition is not less than 75%.

15. A sheet or a film consisting of the styrene-based polymer resin composition in accordance with claim 14.

16. A heat shrink film produced by forming the styrene-based polymer resin composition in accordance with claim 14 into a sheet or a film and then cold stretching it.

17. The method according to claim 3, wherein at least 20% by weight of said (meth)acrylate ester monomer unit composing the styrene-based polymer is an acrylate ester monomer unit.

18. The method according to claim 3, wherein at least 20% by weight of said (meth)acryiate ester monomer unit composing the styrene-based polymer is a n-butyl acrylate monomer unit.

19. A styrene-based polymer resin composition comprising:

(A) 5 to 95% by weight of a styrene-(meth)acrylate ester copolymer resin;

(B) 95 to 5% by weight of a styrene-conjugated diene block copolymer; and (C) 0 to 30% by weight of a polymer compatible to said styrene-based polymer or said styrene-based polymer resin of the above (A) or (B);

wherein, said styrene-(meth)acrylate ester copolymer resin of said component (A) is the styrene-based polymer resin according to claim 11; said styrene-conjugated diene block copolymer of said component (B) has characteristics of the following items (e') to (g'); and further said styrene-based polymer resin composition has characteristics of the following items (h') and (i'):

(e') said styrene-conjugated diene block copolymer is composed of at least two styrene-based polymer blocks and at least one conjugated diene polymer block;

(f') a content of a styrenic monomer unit composing said styrene-conjugated diene block copolymer is 40 to 95% by weight;

(g') a content of a conjugated diene monomer unit composing said styrene-conjugated diene block copolymer is 60 to 5% by weight;

(h') a Vicat softening point of said styrene-based polymer resin composition is in a range of 50 to 99° C.; and (i') a total transmittance of a 1 mm-thick plate of said styrene-based polymer resin composition is not less than 75%.

20. A sheet or a film consisting of the styrene-based polymer resin composition in accordance with claim 19.

21. A heat shrink film produced by forming the styrene-based polymer resin composition in accordance with claim 19 into a sheet or a film and then cold stretching it.

* * * * *